United States Patent
Furukawa et al.

(10) Patent No.: US 10,291,107 B2
(45) Date of Patent: May 14, 2019

(54) POWER GENERATOR, POWER GENERATOR SET AND POWER GENERATION SYSTEM

(71) Applicant: MITSUMI ELECTRIC CO., LTD., Tokyo (JP)

(72) Inventors: Kenichi Furukawa, Sagamihara (JP); Kensuke Yamada, Tachikawa (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 578 days.

(21) Appl. No.: 14/907,026

(22) PCT Filed: Jul. 23, 2014

(86) PCT No.: PCT/JP2014/069430
§ 371 (c)(1),
(2) Date: Jan. 22, 2016

(87) PCT Pub. No.: WO2015/012303
PCT Pub. Date: Jan. 29, 2015

(65) Prior Publication Data
US 2016/0164390 A1    Jun. 9, 2016

(30) Foreign Application Priority Data
Jul. 24, 2013   (JP) .................................. 2013-153981

(51) Int. Cl.
*H02N 2/18*   (2006.01)
*H02N 1/00*   (2006.01)
(Continued)

(52) U.S. Cl.
CPC .......... *H02K 35/00* (2013.01); *H02K 7/1876* (2013.01); *H02K 35/02* (2013.01); *H02N 1/08* (2013.01);
(Continued)

(58) Field of Classification Search
CPC ...... H02K 35/00; H02K 7/1876; H02K 35/02; H02N 1/08; H02N 2/185; H02N 2/188
(Continued)

(56) References Cited

U.S. PATENT DOCUMENTS 5,347,186 A  *  9/1994  Konotchick ......... H02K 7/1876
                                                      310/17
2007/0257291 A1* 11/2007  Okhonin ............... G11C 11/404
                                                      257/296
(Continued)

FOREIGN PATENT DOCUMENTS

EP    0 618 380 A1    10/1994
GB    2 446 685 A      8/2008
(Continued)

OTHER PUBLICATIONS

European Search Report, EP 14829517.3, dated Mar. 8, 2017, 11 pages.
(Continued)

*Primary Examiner* — Thomas M Dougherty
(74) *Attorney, Agent, or Firm* — Miller Nash Graham & Dunn LLP

(57) ABSTRACT

A power generator 100 includes a power generating unit 10 and a supporting member 20 for supporting the power generating unit 10. The power generating unit 10 constitutes a two-degree-freedom vibration system including a first vibration system having a coil assembly 40 and a first spring portion 64 for coupling the coil assembly 40 with a housing 20 and a second vibration system having a magnet assembly 30 and a second spring portion 65 for coupling the magnet assembly 30 with the coil assembly 40. The power generating unit 10 is configured so that each of a first natural
(Continued)

frequency $\omega_1$ of the first vibration system and a second natural frequency $\omega_2$ of the second vibration system is in the range of 14 to 42 Hz.

12 Claims, 18 Drawing Sheets

(51) Int. Cl.
| | |
|---|---|
| *H01L 41/20* | (2006.01) |
| *H02K 35/00* | (2006.01) |
| *H02K 35/02* | (2006.01) |
| *H02N 1/08* | (2006.01) |
| *H02K 7/18* | (2006.01) |

(52) U.S. Cl.
CPC .............. *H02N 2/185* (2013.01); *H02N 2/188* (2013.01); *H02K 2201/18* (2013.01); *H02K 2213/03* (2013.01)

(58) Field of Classification Search
USPC ....... 290/1 R, 1 E; 310/26, 30, 339; 322/2 A
See application file for complete search history.

(56) References Cited

U.S. PATENT DOCUMENTS

| | | | |
|---|---|---|---|
| 2010/0045119 A1 | 2/2010 | Jackson et al. | |
| 2010/0194117 A1* | 8/2010 | Pabon ................ | H02K 35/02 290/1 R |
| 2011/0074162 A1 | 3/2011 | Cottone et al. | |
| 2011/0109102 A1* | 5/2011 | McCoy ................ | F03G 7/08 290/1 R |

FOREIGN PATENT DOCUMENTS

| | | |
|---|---|---|
| JP | 2011-517277 A | 5/2011 |
| JP | 2011-172351 A | 9/2011 |
| JP | 2011-172352 A | 9/2011 |
| JP | 2014-079118 A | 5/2014 |
| WO | 2007121380 A2 | 10/2007 |
| WO | 2009/127823 A2 | 10/2009 |

OTHER PUBLICATIONS

International Search Report for Application No. PCT/JP2014/069430, dated Oct. 21, 2014, 2 pages.

* cited by examiner (a)

(b)

POWER GENERATOR, POWER GENERATOR SET AND POWER GENERATION SYSTEM

FIELD OF THE INVENTION

The present invention relates to a power generator, a power generator set and a power generation system.

BACKGROUND ART

In recent years, there has been developed an electromechanical power generating device (power generator) which can convert mechanical vibration energy into electric energy (for example, see patent document 1). An electromechanical power generating device disclosed in the patent document 1 has one resonance frequency. From the view point of efficiently generating electric power with a small space, it may be considered to carry out power generation with this electromechanical power generating device by utilizing vibration of an air-conditioning duct, for example.

In this regard, the air-conditioning duct has its own natural frequency. Due to an action of the natural frequency, plate materials forming the air-conditioning duct are always vibrated in a direction substantially perpendicular to a flowing direction of fluid (air) during air-conditioning. Examples of a vibration source for this vibration of the plate materials include a pressure difference (pulse beat) of the fluid flowing in the duct, variation of swirl or density of the fluid caused by an enforced changing of the flowing direction of the fluid in the duct and motion vibration caused by a walking of a person or a working of an apparatus and transmitted from the periphery of the duct.

However, when a distribution of a vibration frequency of the duct is shown in a graphic form, it is a rare case that the distribution of the vibration frequency of the duct is expressed as a spectrum form having only one frequency. Generally, the distribution of the vibration frequency of the duct generally has a various spectrum forms depending on the type of duct. Namely, the distribution of the vibration frequency significantly varies according to the type of duct. Since the power generating device disclosed in the patent document 1 has only one resonance frequency as described above, the power generating device utilizes only a part of the vibration frequency of the duct which is distributed over a broad frequency band. In this case, the power generating device cannot efficiently generate the electric power. Further, in the case where the one resonance frequency of the power generating device is significantly different from a main part of the distribution the vibration frequency of the duct, the power generating device cannot efficiently generate the electric power.

RELATED ARTS

Patent Document

Patent document 1: JP 2011-517277A

SUMMARY OF THE INVENTION

Problem to be Solved by the Invention

The present invention has been made in view of the problems mentioned above. Accordingly, it is an object of the present invention to provide a power generator which can efficiently utilize the vibration of the air-conditioning duct to generate the electric power, a power generator set and a power generation system including such a power generator.

Means for Solving Problems

The object described above is achieved by the present invention represented by the following (1) to (18).

(1) A power generator to be used in a state that the power generator is fixedly attached to an air-conditioning duct, the power generator comprising:

a power generating unit for generating electric power by utilizing vibration of the air-conditioning duct; and a supporting member for supporting the power generating unit, wherein the power generating unit constitutes a two-degree-freedom vibration system including a first vibration system having a first mass portion and a first spring portion for coupling the first mass portion with the supporting member and a second vibration system having a second mass portion and a second spring portion for coupling the second mass portion with the first mass portion, wherein a second mass $m_2$ [kg] of the second mass portion is smaller than a first mass $m_1$ [kg] of the first mass portion, and wherein the power generating unit is configured so that each of a first natural frequency $\omega_1$ of the first vibration system and a second natural frequency $\omega_2$ of the second vibration system is in the range of 14 to 42 Hz by adjusting the first mass $m_1$ [kg] of the first mass portion, a first spring constant $k_1$ [N/m] of the first spring portion, the second mass $m_2$ [kg] of the second mass portion and a second spring constant $k_2$ [N/m] of the second spring portion.

(2) The power generator according to the above (1), wherein the power generator is configured so that each of the first natural frequency $\omega_1$ of the first vibration system and the second natural frequency $\omega_2$ of the second vibration system is in the range of 14 to 38 Hz.

(3) The power generator according to the above (1) or (2), wherein a first natural angular frequency $\Omega_1=(k_1/m_1)^{1/2}$ of the first vibration system is in the range of 200 to 250 rad/S, a second natural angular frequency $\Omega=(k_2/m_2)^{1/2}$ of the second vibration system is in the range of 60 to 120 rad/S and a mass ratio $\mu=m_2/m_1$ of the first mass portion and the second mass portion is in the range of 0.4 to 1.

(4) The power generator according to any one of the above (1) to (3), wherein when a power generation amount of the power generator at a first resonance frequency of the power generator is defined as "$A_1$" [mW/100 mG] and a power generation amount of the power generator at a second resonance frequency of the power generator is defined as "$A_2$" [mW/100 mG], the power generator is configured so that "$A_1$" and "$A_2$" satisfy a relationship of $0.9A_2 \leq A_1 \leq 1.1 A_2$.

(5) The power generator according to the above (4), wherein when a minimum power generation amount of the power generator in a frequency band between the first resonance frequency and the second resonance frequency is defined as "$A_3$" [mW/100 mG], the power generator is configured so that "$A_3$" is equal to or more than $0.25[(A_1+A_2)/2]$ [mW/100 mG] but less than $0.8[(A_1+A_2)/2]$ [mW/100 mG].

(6) The power generator according to the above (4), wherein when a minimum power generation amount of the power generator in a frequency band between the first resonance frequency and the second resonance frequency is defined as "$A_3$" [mW/100 mG], the power generator is configured so that "$A_3$" is equal to or more than $0.8[(A_1+A_2)/2]$ [mW/100 mG] but equal to or less than $0.9[(A_1+A_2)/2]$ [mW/100 mG].

(7) The power generator according to any one of the above (4) to (6), wherein the power generator is configured to satisfy the relationship of the power generation amounts by setting damping coefficients $C_2$ of the second vibration system respectively corresponding to the first natural frequency and the second natural frequency.

(8) The power generator according to the above (7), wherein the damping coefficient $C_2$ corresponding to the first natural frequency is in the range of 6 to 10 [N/(m/s)] and the damping coefficient $C_2$ corresponding to the second natural frequency is in the range of 6 to 10 [N/(m/s)].

(9) The power generator according to any one of the above (1) to (8), wherein the second mass portion includes a permanent magnet provided so that the permanent magnet can be displaced along a magnetization direction thereof, and the first mass portion includes a coil provided on the outer peripheral side of the permanent magnet so as to surround the permanent magnet.

(10) The power generator according to the above (9), wherein the first mass portion further includes a holding member for holding the coil, and the holding member is formed of a resin material containing non-magnetic metallic particles.

(11) The power generator according to the above (9) or (10), wherein the second mass portion further includes a magnetic member fixed to the permanent magnet, the magnetic member is formed of a magnetic material having a specific weight equal to or more than 7, and the permanent magnet is coupled with the second spring portion through the magnetic member.

(12) The power generator according to any one of the above (1) to (8), wherein at least one of the first mass portion and the second mass portion includes a permanent magnet for generating lines of magnetic force, the second spring portion includes a magnetostrictive member which can be elastically deformed and is formed of a magnetostrictive material, and the power generator includes a coil provided so that the lines of magnetic force pass inside the coil in an axial direction thereof, whereby a voltage is generated in the coil due to variation of density of the lines of magnetic force.

(13) The power generator according to the above (12), wherein the coil is provided on the outer peripheral side of the magnetostrictive member.

(14) The power generator according to any one of the above (1) to (8), wherein the second spring portion includes a piezoelectric member which can be elastically deformed and is formed of a piezoelectric material, and the power generator includes a pair of electrodes provided so as to face each oilier through the piezoelectric member.

(15) The power generator according to any one of the above (1) to (8), wherein the second mass portion includes an electret provided so that the electret can be displaced along a direction substantially perpendicular to a polarization direction thereof, and the power generator includes a pair of electrodes provided so as to face each other through the electret.

(16) The power generator according to any one of the above (1) to (15), wherein the power generator further includes a weight for adjusting a power generation amount of the power generator.

(17) A power generator set comprising:
the power generator defined in any one of the above (1) to (15); and
a weight for adjusting a power generation amount of the power generator.

(18) A power generation system comprising:
the power generator defined in any one of the above (1) to (15); and
an air-conditioning duct to which the power generator is fixedly attached through the supporting member.

Effects of the Invention

According to the present invention, since the power generator is configured so that the natural frequencies of the two vibration systems become appropriate values, it is possible to efficiently utilize the vibration of the air-conditioning duct, thereby generating the electric power with high power generation efficiency.

DETAILED DESCRIPTION OF THE PREFERRED EMBODIMENTS

Hereinafter, a power generator of the present invention will be described based on preferred embodiments shown in the accompanying drawings.

First Embodiment

Description will be first given to a first embodiment of the power generator of the present invention.

Figure 1:
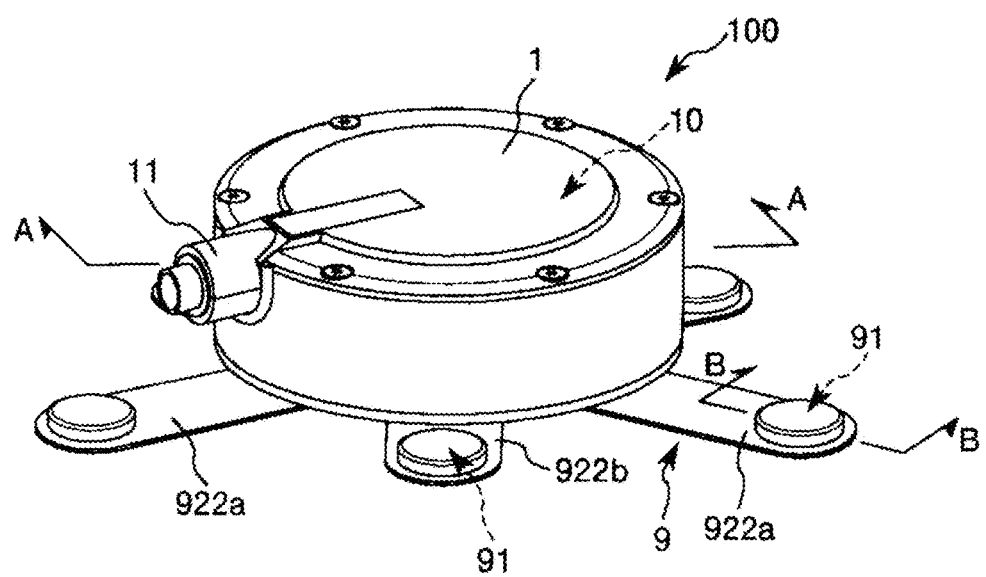
FIG. 1 is a perspective view showing a first embodiment of a power generator of the present invention.
Figure 2:
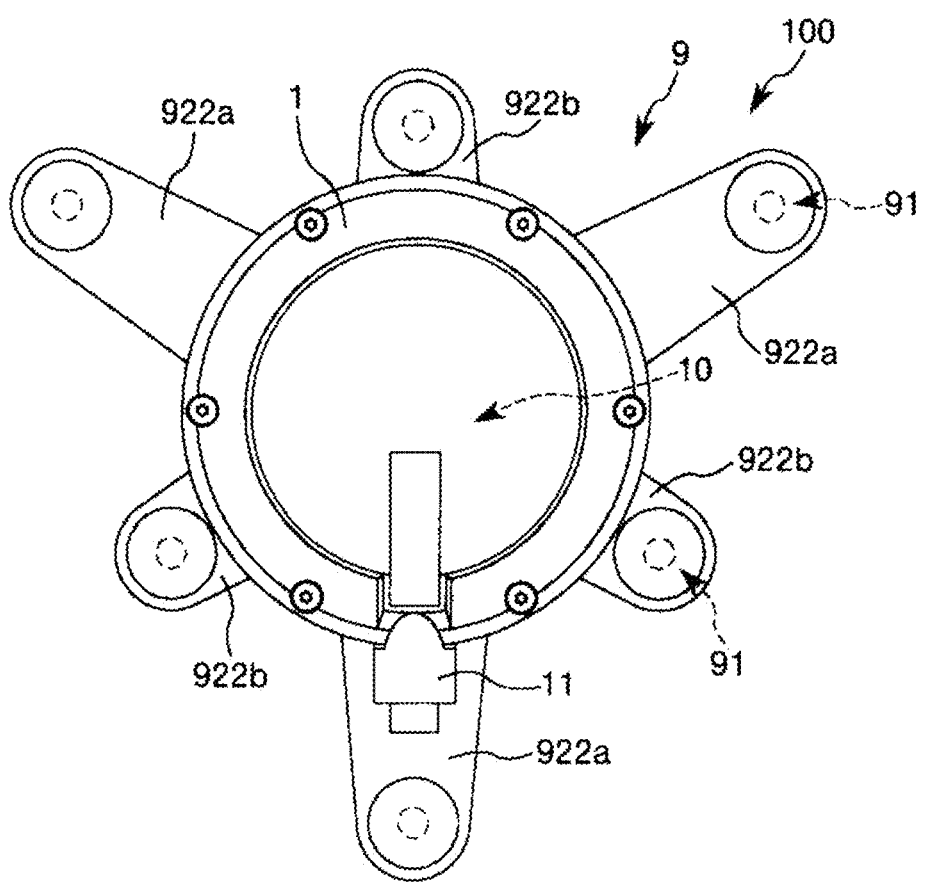
FIG. 2 is a planar view showing the power generator shown in FIG. 1.
Figure 3:
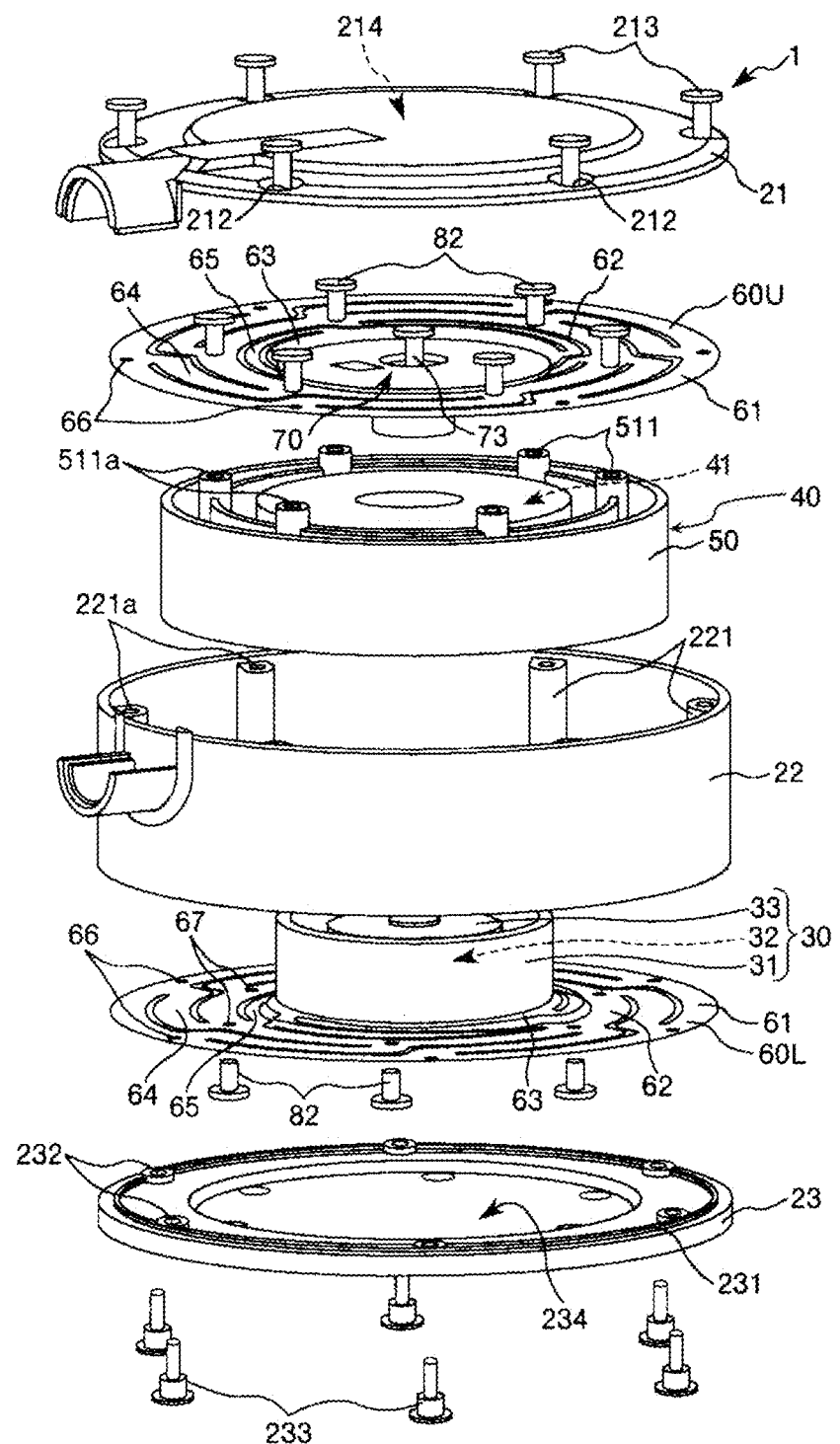
FIG. 3 is an exploded perspective view showing a main unit included in the power generator shown in FIG. 1.
Figure 4:
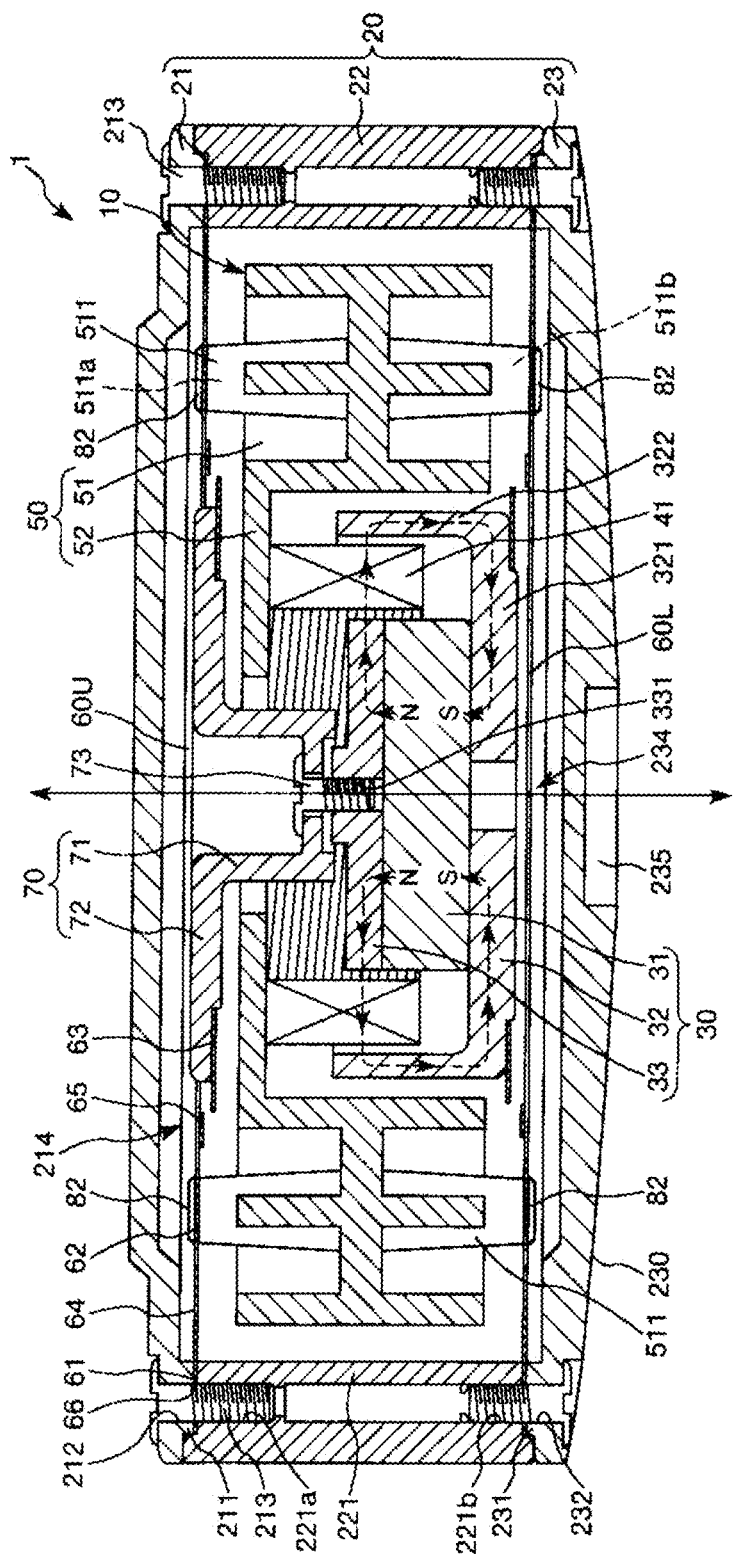
FIG. 4 is a cross-sectional view taken along an A-A line in FIG. 1 (longitudinal cross-sectional view of the main unit shown in FIG. 3).
Figure 5:
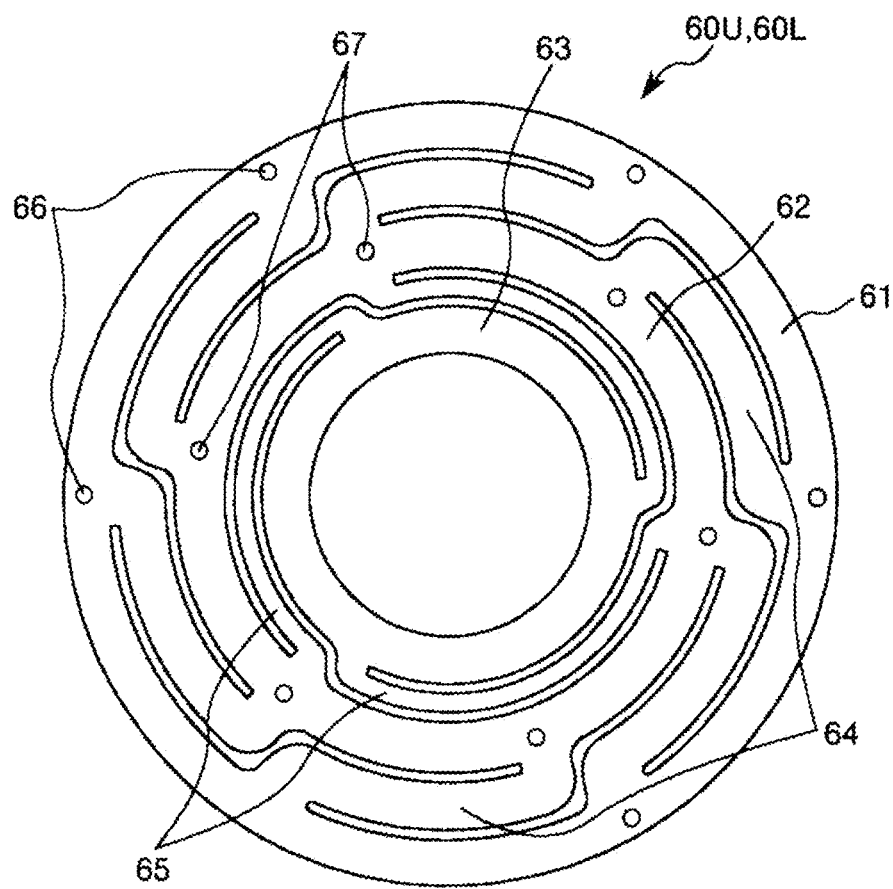
FIG. 5 is a planar view showing a leaf spring included in the main unit shown in FIG. 6 is a model diagram for explaining a configuration of a two-degree-freedom vibration system included in a power generating unit.

FIG. 1 is a perspective view showing the first embodiment of the power generator of the present invention. FIG. 2 is a planar view showing the power generator shown in FIG. 1. FIG. 3 is an exploded perspective view showing a main unit included in the power generator shown in FIG. 1. FIG. 4 is a cross-sectional view taken along an A-A line in FIG. 1 (longitudinal cross-sectional view of the main unit shown in FIG. 3). FIG. 5 is a planar view showing a leaf spring included in the main unit shown in FIG. 3.

Hereinafter, an upper side in each of FIGS. 1, 3 and 4 is referred to as "upper" or "upper side" and a lower side in each of FIGS. 1, 3 and 4 is referred to as "lower" or "lower side". A front side of the paper in each of FIGS. 2 and 5 is referred to as "upper" or "upper side" and a rear side of the paper in each of FIGS. 2 and 5 is referred to as "lower" or "lower side".

A power generator 100 shown in FIGS. 1 and 2 is used in a state that the power generator 100 is fixedly attached to an air-conditioning duct. The power generator 100 includes a main unit 1, an attachment 9 for fixedly attaching the main unit 1 to the air-conditioning duct by attraction thereof and a connector 11 to be coupled to an external device. The connector 11 is provided in a peripheral surface of the main unit 1 so as to outwardly extend from the main unit 1.

As shown in FIGS. 3 and 4, the main unit 1 includes a housing (supporting member) 20 and a power generating unit 10 supported in the housing 20 so that the power generating unit 10 can be vibrated in a vertical direction in FIG. 4. The power generating unit 10 has a pair of an upper leaf spring 60U and a lower leaf spring 60L opposed to the upper leaf spring 60U, a magnet assembly 30 supported between the pair of leaf springs 60L, 60U and having a permanent magnet 31 and a coil assembly 40 having, a coil 41 provided on the outer peripheral side of the permanent magnet 31 so as to surround the permanent magnet 31. In this embodiment, the upper leaf spring 60U and the lower leaf spring 60L have a shape substantially identical to each other.

<<Housing 20>>

As shown in FIGS. 3 and 4, the housing 20 has a cover 21, a base (support board) 23 supporting the power generating unit 10 on the upper side (one surface side) of the base 23 and a cylindrical portion 22 provided between the cover 21 and the base 23 so as to surround the power generating unit 10.

The cover 21 has a discoid shape and includes a circular portion and an annular lib (a ring-shaped lib) 211 integrally formed around a periphery of the circular portion so as to downwardly protrude from the periphery of the circular portion. Six through-holes 212 are formed in the lib 211 at substantially regular intervals. Further, a concave portion (runoff) 214 is defined by the cover 21 on the inner side of the lib 211 so as to downwardly open. Since the power generating unit 10 can be displaced (retracted) in the concave portion 214 at the time of vibration, it is possible to prevent the power generating unit 10 from contacting with the cover 21.

The cylindrical portion 22 has a cylindrical shape. An outer diameter of the cylindrical portion 22 is substantially equal to an outer diameter of the cover 21. When the power generating unit 10 is assembled in the housing 20 (hereinafter, this state is referred to as "assembled state"), a main part of the power generating unit 10 which contributes to power generation is disposed in the cylindrical portion 22.

Six boss sections 221 are formed on an inner circumferential surface of the cylindrical portion 22 along a height direction of the cylindrical portion 22 so as to respectively correspond to the through-holes 212 of the cover 21. Upper threaded holes 221a are respectively formed on upper ends of the boss sections 221. In addition, six through-holes 66 are formed in a peripheral portion of each of the leaf springs 60U, 60L (that is, a first circular portion 61 of each of the leaf springs 60U, 60L) along a circumferential direction of the upper leaf spring 60U at substantially regular intervals.

The peripheral portion of the upper leaf spring 60U is disposed between the cover 21 and the cylindrical portion 22, and then screws 213 are respectively screwed into the upper threaded holes 221a of the boss sections 221 passing through the through-holes 212 of the cover 21 and the through-holes 66 of the upper leaf spring 60U. This makes it possible to fixedly hold the peripheral portion of the upper leaf spring 60U between the cover 21 and the cylindrical portion 22.

The base 23 has a discoid shape and includes a circular portion and an annular lib (a ring-shaped lib) 231 integrally formed around a periphery of the circular portion so as to upwardly protrude from the periphery of the circular portion. Six through-holes 232 are formed in the lib 231 at substantially regular intervals. Further, a concave portion (runoff) 234 is defined by the base 23 on the inner side of the lib 231 so as to upwardly open. Since the power generating unit 10 can be displaced (retracted) in the concave portion 234 at the time of vibration, it is possible to prevent the power generating unit 10 from contacting with the base 23.

In addition, lower threaded holes (female screws) 221b are respectively formed on lower ends of the boss sections 221. The peripheral portion of the lower leaf spring 60L (that is, the first circular portion 61 of the lower leaf spring 60L) is disposed between the base 23 and the cylindrical portion 22, and then screws 233 are respectively screwed into the lower threaded holes 221b of the boss sections 221 passing through the through-holes 232 of the base 23 and the through-holes 66 of the lower leaf spring 60L. This makes it possible to fixedly hold the peripheral portion of the lower leaf spring 60L between the base 23 and the cylindrical portion 22.

As shown in FIG. 4, a lower surface (other surface) 230 of the base 23 forms a curved convex surface downwardly protruding. An effect provided by such a curved convex surface will be explained below A concave portion 235 is formed on a central portion of the lower surface 230 of the base 23 so as to be capable of receiving a permanent magnet 911 constituting a part of the attachment 9 and the like.

A constituent material for the housing 20 (the cover 21, the cylindrical portion 22 and the base 23) is not particularly limited to a specific material, but examples of the constituent material include a metallic material, a ceramic material, a resin material and a combination of two or more of the above materials.

A size of the housing 20 is not particularly limited to a specific value, but an average width (average diameter) of the housing 20 (the base 23) is preferably in the range of about 60 to 120 mm, and an average height of the housing 20 is not particularly limited to a specific value, but preferably in the range of about 20 to 50 mm, and more preferably in the range of about 30 to 40 mm from the view point of downsizing the power generator 100 (from the view point of reducing the height of the power generator 100).

The power generating unit 10 is supported in the housing 20 through the upper leaf spring 60U and the lower leaf spring 60U in a state that the power generating unit 10 can be vibrated.

<<Upper Leaf Spring 60U and Lower Leaf Spring 60L>>

The peripheral portion of the upper leaf spring 60U is fixed between the cover 21 and the cylindrical portion 22 in a state that the peripheral portion of the upper leaf spring 60U is held by the cover 21 and the cylindrical portion 22. The peripheral portion of the lower leaf spring 60L is fixed between the base 23 and the cylindrical portion 22 in a state that the peripheral portion of the lower leaf spring 60L is held by the base 23 and the cylindrical portion 22.

Each of the leaf springs 60L, 60U is a component having a circular shape in entire shape and formed of a metallic-thin plate such as an iron plate, a stainless steel plate. As shown in FIG. 5, each of the leaf springs 60L, 60U has the first circular portion 61, a second circular portion 62 having an outer diameter smaller than an inner diameter of the first circular portion 61 and a third circular portion 63 having an outer diameter smaller than an inner diameter of the second circular portion 62. In each of the leaf springs 60L, 60U, the first circular portion 61, the second circular portion 62 and the third circular portion 63 are arranged from the outside to the inside thereof in this order.

Further, the first circular portion 61, the second circular portion 62 and the third circular portion 63 are arranged concentrically in each of the leaf springs 60L, 60U. The first circular portion 61 is coupled with the second circular portion 62 through a plurality of first spring portions 64 (in this embodiment, the number of the first spring portions 64 is six). The second circular portion 62 is coupled with the third circular portion 63 through a plurality of second spring portions 65 (in this embodiment, the number of the second spring portion 65 is three).

The six through-holes 66 are formed in the first circular portion 61 of each of the leaf springs 60L, 60U along a circumferential direction of the first circular portion 61 at substantially regular intervals (at regular angular-intervals of about 60 degree). As described above, the screws 213 are respectively screwed into the upper threaded holes 221a of the boss sections 221 passing through the through-holes 66 of the upper leaf spring 60U. On the other hand, the screws 233 are respectively screwed into the lower threaded holes 221b of the boss sections 221 passing through the through-holes 66 of the lower leaf spring 60L.

Further, six through-holes 67 are formed in the second circular portion 62 of each of the leaf springs 60L, 60U along a circumferential direction of the second circular portion 62 at substantially regular intervals (at regular angular-intervals of about 60 degree). Furthermore, a coil holding portion 50 (which will be explained below) of the coil assembly 40 has six boss sections 511 formed along a circumferential direction of the coil holding portion 50 so as to extend in the vertical direction. Upper threaded holes 511a are respectively formed on upper ends of the boss sections 511. Lower threaded holes 511b are respectively formed on lower ends of the boss sections 511.

Screws 82 are respectively screwed into the upper threaded holes 511a of the boss sections 511 passing through the through-holes 67 of the upper leaf spring 60U. This makes it possible to couple the second circular portion 62 of the upper leaf spring 60U with the coil assembly 40 (the coil holding portion 50). In the same manner, the other screws 82 are respectively screwed into the lower threaded holes 511b of the boss sections 511 passing through the through-holes 67 of the lower leaf spring 60L. This makes it possible to couple the second circular portion 62 of the lower leaf spring 60L with the coil assembly 40.

A spacer 70 disposed above the magnet assembly 30 is coupled with the third circular portion 63 of the upper leaf spring 60U. On the other hand, the magnet assembly 30 is coupled with the third circular portion 63 of the lower leaf spring 60L. In this embodiment, the spacer 70 is coupled with the magnet assembly 30 by a screw 73.

Each of the six first spring portions 64 in the leaf springs 60L, 60U has an arch-shaped portion (a substantially sigmoidal shape). Each of the first spring portions 64 is arranged in a space between the first circular portion 61 and the second circular portion 62 so as to constitute three pairs arranged rotationally symmetrically around a central axis of the third circular portion 63 with each other. Specifically, the two first spring portions 64 constituting one of the three pairs are arranged so as to be opposed to each other through the second circular portion 62 (the coil assembly 40). Each of the first spring portions 64 has one end coupled with the first circular portion 61 in the vicinity of the through-hole 66 of the first circular portion 61, the arch-shaped portion extending along the circumferential direction of the first circular portion 61 and the second circular portion 62 in the counterclockwise direction, and another end coupled with the second circular portion 62 in the vicinity of the through-hole 67.

The six first spring portions 64 in each of the leaf springs 60L, 60U support the second circular portion 62 (couple the second circular portion 62 with the first circular portion 61) in a state that the second circular portion 62 can be vibrated relative to the first circular portion 61 in the vertical direction in FIG. 4. As described above, each of the first circular portions 61 is fixed to the housing 20. Further, each of the second circular portions 62 is fixed to the coil assembly 40. Therefore, when the vibration of the air-conditioning duct is transmitted to the housing 20, this vibration is further transmitted to the second circular portion 62 through the first spring portions 64. As a result, the coil assembly 40 can be vibrated relative to the housing 20.

On the other hand, each of the three second spring portions 65 in each of the leaf springs 60L, 60U has an arch-shaped portion (a substantially sigmoidal shape). Specifically, each of the second spring portions 65 is arranged in a space between the second circular portion 62 and the third circular portion 63 so as to be rotational symmetry around the central axis of the third circular portion 63 (the magnet assembly 30) with each other. Each of the second spring portions 65 has one end coupled with the second circular portion 62 in the vicinity of the through-hole 67 of the second circular portion 62, the arch-shaped portion extending along the circumferential direction of the second circular portion 62 and the third circular portion 63 in the clockwise direction, and another end coupled with the third circular portion 63 the second circular portion 62.

The three second spring portions 65 in each of the leaf springs 60L, 60U support the third circular portion 63 (couple the third circular portion 63 with the second circular portion 62) in a state that the third circular portion 63 can be vibrated relative to the second circular portion 62 in the vertical direction in FIG. 4. As described above above, each of the second circular portions 62 is fixed to the coil assembly 40. Further, each of the third circular portions 63 of the leaf springs 60L, 60U is directly or indirectly fixed to the magnet assembly 30. Therefore, the vibration which is transmitted from the air-conditioning duct to the second circular portion 62 is further transmitted to the third circular portion 63 through the second spring portions 65. As a result, the magnet assembly 30 can be vibrated relative to the coil assembly 40.

As shown in FIG. 5, each of the leaf springs 60L, 60U explained above has a rotationally symmetrical shape around a central axis thereof (the central axis of the third circular portion 63). This makes it possible to prevent variation in spring constants of the first spring portions 64 and the second spring portions 65 in the circumferential direction. As a result, it is possible to enhance a lateral stiffness of each of the leaf springs 60L, 60U (stiffness along a direction substantially perpendicular to the thickness direction of each of the leaf springs 60L, 60U) as a whole. In addition, it is possible to make an assembly work of the power generator 100 (the main unit 1) easier.

In order to set the spring constants ($k_1$, $k_2$) of each of the spring portions 64, 65 to be desired values, an average thickness of each of the leaf springs 60L, 60U can be properly adjusted. Specifically, the average thickness of each of the leaf springs 60L, 60U is preferably in the range of about 0.1 to 0.4 mm, and more preferably in the range of about 0.2 to 0.3 mm. By setting the average thickness of each of the leaf springs 60L, 60U to fall within the above range, it is possible to reliably prevent occurrence of plastic deformation, break or the like of each of the leaf springs 60L, 60U. This makes it possible to use the power generator 100 for a long period in a state that the power generator 100 is fixdely attached to the air-conditioning duct.

The magnet assembly 30 having the permanent magnet 31 is provided between the upper leaf spring 60U and the lower leaf spring 60L.

<<Magnet Assembly 30>>

The magnet assembly 30 includes the permanent magnet 31 having a columnar shape, a back yoke (magnetic member) 32 having a bottomed cylindrical shape, and a circular yoke (magnetic member) 33 provided on the permanent magnet 31. The magnet assembly 30 is supported between the leaf springs 60U, 60L in a state that an outer periphery of a bottom surface of the back yoke 32 is coupled with the third circular portion 63 of the lower leaf spring 60L and the yoke 33 is coupled with the third circular portion 63 of the upper leaf spring 60U through the spacer 70.

The permanent magnet 31 is disposed in a state that its north pole faces to the upper side and its south pole faces to the lower side. Thus, the permanent magnet 31 (the magnet assembly 30) can be displaced in a magnetization direction thereof (the vertical direction).

Examples of the permanent magnet 31 include an alnico magnet, a ferrite magnet, a neodymium magnet, a samarium-cobalt magnet, a bonded magnet obtained by molding a compound material constituted of pulverized materials of the above magnets which are mixed with a resin material or a rubber material. The permanent magnet 31 is fixed to the back yoke 32 and the yoke 33 by attraction force caused by its own magnetic force, adhesive force by an adhesive agent or the like.

The yoke 33 has a size in a planar view substantially equal to a size of the permanent magnet 31 in a planar view. The yoke 33 has a threaded hole 331 formed in a central portion thereof.

The back yoke 32 has a bottom plate 321 and a cylindrical portion 322 upwardly extending from an outer periphery of the bottom plate 321. The permanent magnet 31 is disposed on a central portion of the bottom plate 321 concentrically with the cylindrical portion 332. Further, a threaded hole is formed in the central portion of the bottom plate. The magnet assembly 30 having such a back yoke 32 can increase a magnetic flux generated from the permanent magnet 31.

As a constituent material for the back yoke 32 and the yoke 33, it is possible to use a magnetic material having a specific weight equal to or more than 7 such as a pure iron (for example, JIS SUY), a soft iron, a carbon iron, a magnetic steel (a silicon steel), a high-speed tool steel, a structural steel (for example, JI SS400), a stainless and a permalloy, and a combination of two or more of the above magnetic materials. By using such a magnetic material, it is possible to ensure a sufficient mass of the magnet assembly 30 with preventing the magnet assembly 30 from being larger in size. The coil assembly 40 is provided between the magnet assembly 30 and the housing 20.

<<Coil Assembly 40>>

The coil assembly 40 includes the coil 41 and the coil holding portion (holding member) 50 for holding the coil 41. The coil holding portion 50 includes a main body 51 having a cylindrical shape in entire shape and a ring-shaped portion 52 disposed on the upper inner side of the main body 51.

The cylindrical shape of the main body 51 resembles a shape formed by lightening a peripheral portion of a cylindrical block in a vertical direction thereof. The six boss sections 511 are formed in a peripheral portion of the main body 51 along a circumferential direction of the main body Si so as to extend in the vertical direction. The upper threaded holes 511a are respectively formed on the upper ends of the boss sections 511. The lower threaded holes (female screws) 511b are respectively formed on the lower ends of the boss sections 511.

The ring-shaped portion 52 is integrally formed with the main body 51. The ring-shaped member 52 has an inner diameter larger than an outer diameter of the spacer 70 (the main body 71). The coil 41 is supported on a lower surface of the ring-shaped member 52 and positioned close to an inner periphery of the ring-shaped portion 52.

It is preferable that the coil holding portion 50 is formed of a resin material containing non-magnetic metallic particles. By using such a material, it is possible to ensure a sufficient mass of the coil assembly 40 with preventing the coil assembly 40 from being larger in size. Examples of the non-magnetic metallic particle include a metallic particle made of a stainless material, tungsten, lead, copper, silver, gold or the like. Examples of the resin material include ABS, PBT, PA, POM, PPS and PC.

The coil 41 is designed so that the coil 41 has an outer diameter smaller than the cylindrical portion 322 of the back yoke 32 and an inner diameter larger than outer diameters of the permanent magnet 31 and the yoke 33. This makes it possible to dispose the coil 41 between the cylindrical portion 322 of the back yoke 32 and the permanent magnet 31 with keeping away from the cylindrical portion 322 and the permanent magnet 31 (without contacting with the cylindrical portion 322 and the permanent magnet 31) in the assembled state.

The coil 41 can be displaced relative to the permanent magnet 31 in the vertical direction due to the vibration of the power generating unit 10. At this time, density of magnetic lines generated from the permanent magnet 31 and passing through the coil 41 varies, and thus voltage is generated in the coil 41.

The coil 41 is formed by winding a wire. Examples of the wire include a wire obtained by covering a copper base line with an insulating film, a wire obtained by covering a copper base line with an insulating film having an adhesion function and a combination thereof. A winding number of the wire is not particularly limited to a specific number and may be appropriately set according to a cross-sectional area of the wire and the like. A cross-sectional shape of the wire may be any shape such as a polygonal shape including a triangular shape, a square shape, a rectangle shape and a hexagonal shape, a circular shape and an elliptical shape.

Both ends of the wire forming the coil 41 are connected with the connector 11 through an electric voltage output unit (not shown) provided above the ring-shaped portion 52 of the coil holding portion 50. This makes it possible to output the voltage generated in the coil 41 from the connector 11.

The magnet assembly 30 is coupled with the upper leaf spring 60U through the spacer 70.

<<Spacer 70>>

The spacer 70 has a main body 71 having a bottomed cylindrical shape and a ring-shaped flange 72 integrally formed with the main body 71 along an outer periphery of an upper end of the main body 71. A bottom portion of the main body 71 is coupled with the magnet assembly 30 (the yoke 33) by the screw 73. Further, the third circular portion 63 of the upper leaf spring 60U is fixed to an outer periphery of a lower surface of the flange 72.

Examples of a constituent material for the spacer 70 include magnesium, aluminum and a resin material for molding.

In the main unit 1 having the above structure, a first vibration system and a second vibration system are constituted. In the first vibration system, the coil assembly (first mass portion) 40 is vibrated relative to the housing 20 through the first spring portions 64. In the second vibration system, the magnet assembly (second mass portion) 30 is vibrated relative to the coil assembly 40 through the second spring portions 65. In other words, in the power generator 100, the power generating unit 10 constitutes a two-degree-freedom vibration system having the first vibration system and the second vibration system.

Figure 6:
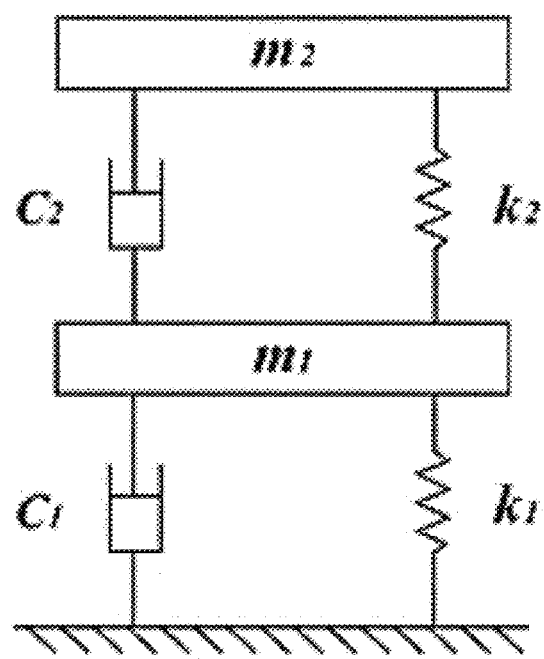
Figure 7:
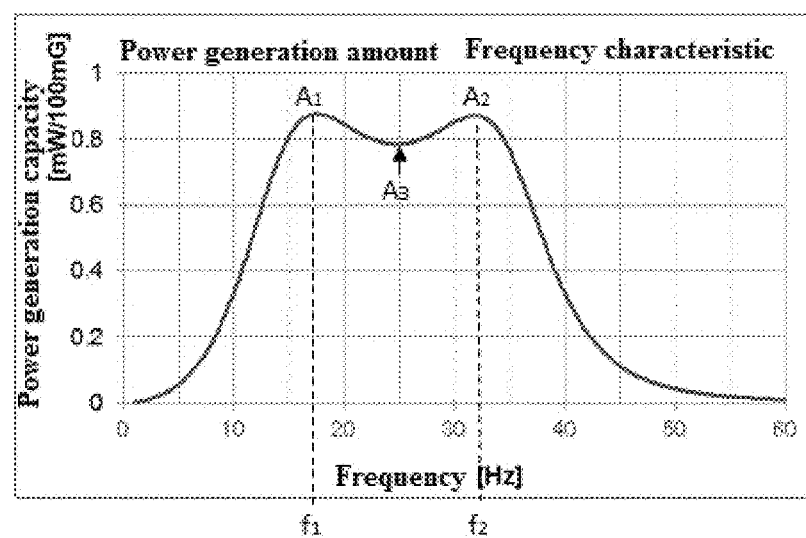
FIG. 7 is a view for explaining frequency characteristics of a power generation amount of the two-degree-freedom vibration system shown in FIG. 6.

FIG. 6 is a model diagram for explaining a configuration of the two-degree-freedom vibration system (the first vibration system and the second vibration system) included in the power generating unit 10. FIG. 7 is a view for explaining frequency characteristics of a power generation amount of the two-degree-freedom vibration system shown in FIG. 6.

In the power generating unit 10 having such a two-degree-freedom vibration system, the first vibration system has a first natural frequency $\omega_1$ [Hz] determined by a first mass $m_1$ [kg] of the coil assembly 40, a mass ratio $\mu=m_2/m_1$ of the coil assembly 40 and the magnet assembly 30 and the first spring constant $k_1$ [N/m] of the first spring portion 64. On the other hand, the second vibration system has a second natural frequency $\omega_2$ [Hz] determined by a second mass $m_2$ [kg] of the magnet assembly 30, the mass ratio $\mu$ of the coil assembly 40 and the magnet assembly 30 and the second spring constant $k_2$ [N/m] of the second spring portion 65.

Specifically, the first and second natural frequencies $\omega_1$, $\omega_2$ can be expressed by the following motion equation (1).

[Motion equation (1)]

$$\begin{bmatrix} \omega_1^2 \\ \omega_2^2 \end{bmatrix} = \frac{1}{2}\{\Omega_1^2 + (1+\mu)\Omega_2^2\} \mp \frac{1}{2}\sqrt{\{\Omega_1^2 + (1+\mu)\Omega_2^2\}^2 - 4\Omega_1^2\Omega_2^2} \quad (1)$$

wherein "$\mu$" is defined by $$\frac{m_2}{m_1},$$

"$\Omega_1$" is defined by $$\sqrt{\frac{k_1}{m_1}}$$

and "$\Omega_2$" is defined by $$\sqrt{\frac{k_2}{m_2}}$$

Namely, each of the first natural frequency $\omega_1$ and the second natural frequency $\omega_2$ of the two-degree-freedom vibration system is determined by the above three parameters of the mass ratio "$\mu$" of the coil assembly 40 and the magnet assembly 30, a first natural angular frequency "$\Omega_1$" [rad/S] of the first vibration system and a second natural angular frequency "$\Omega_2$" [rad/S] of the second vibration system.

The two-degree-freedom vibration system shown in FIG. 6 involves damping based on damping coefficients $C_1$, $C_2$ (hereinafter, the damping based on the damping coefficient $C_1$ is referred to as "damping $C_1$" and the damping based on the damping coefficient $C_2$ is referred to as "damping $C_2$" simply). The damping $C_1$ is structural damping caused by deflection of the first spring portions 64. On the other hand, the damping $C_2$ is a combination of structural damping of the second spring portions 65 and damping caused by counterforce for suppressing the vibration generated in the power generating unit 10 when the generated electric power is consumed by an external load. In the case of employing a power generating method due to an electromagnetic induction as is the case with this embodiment, electrical current generated by the electromagnetic induction between the permanent magnet 31 and the coil 41 flows in a loop passing through the external load of the power generator 100. In this case, the later damping (the damping caused by the counterforce) is damping caused by thrust force of the electrical current generated when the electrical current flows in the loop. Namely, the later damping is damping caused by so-called "counter electromotive force".

The damping caused by the counter electromotive force is determined by a thrust constant $K_f$, a resistance value R of the coil 41 and inductance of the coil 41. In a state that no load is applied to the power generator 100 (an open state of the coil 41), the damping $C_2$ becomes only the structural damping of the second spring portions 65. In this regard, the structural damping of the second spring portions 65 is significantly smaller than the damping caused by the counter electromotive force explained above, thus there is no actual problem even if the structural damping is ignored. Therefore, the following description will be given as assuming that the damping $C_2$ means the damping caused by the counter electromotive force.

A power generation amount (power generation capacity) of the two-degree-freedom vibration system expressed by the above equation (1) involves the damping $C_2$ containing the damping caused by the counter electromotive force. As shown in FIG. 7, the power generation amount of the two-degree-freedom vibration system takes maximum values $A_1$ and $A_2$ [mW/100 mG] at two resonance frequencies (a first resonance frequency $f_1$ and a second resonance frequency $f_2$) respectively caused by the natural frequencies $\omega_1$, $\omega_2$. Further, in the power generator 100, the power generating unit 10 can be efficiently vibrated relative to the housing 20 in a frequency band between these two resonance frequencies $f_1$, $f_2$. In the case where the two-degree-freedom vibration system does not involve the damping $C_2$, the natural frequencies $\omega_1$ and $\omega_2$ are respectively equal to the resonance frequencies $f_1$ and $f_2$.

In the present invention, the power generator 100 (the power generating unit 10) is configured so that each of the first natural frequency $\omega_1$ of the first vibration system and the second natural frequency $\omega_2$ of the second vibration system is set to be in the range of 14 to 42 Hz by adjusting the first mass $m_1$ [kg] of the coil assembly 40, the first spring constant $k_1$ [N/m] of the first spring portion 64, the second mass $m_2$ [kg] of the magnet assembly 30 and the second spring constant $k_2$ [N/m] of the second spring portion 65. This allows the power generating unit 10 (the power generator 100) to efficiently utilize the vibration of the air-conditioning duct, thereby generating the electric power with high power generation efficiency. Hereinafter, description will be given to this point.

Although a vibration frequency of the air-conditioning duct varies depending on various factors, a main factor is a pulse beat of gas which coincides with the rotation number of an air blower and a natural frequency of a vibrating surface of the air-conditioning duct.

Thus, consideration will be first given to the rotation number of the air blower. As an air blower used for air-conditioning in a business office, a facility, a building or the like, an induction motor is generally used. The rotation number of the induction motor is determined by a frequency of a supplied alternating-current source, the number of motor magnetic poles and a slip ratio. The rotation number of the induction motor is generally distributed in the range of 15.8 to 28.5 Hz. At the time of carrying out the air-conditioning, air flows from the air blower to an air-conditioning port (an intake port, an exhaust port and an air blowing port) and pressure caused by the flowing air is transmitted to the whole of the air-conditioning duct. Thus, the pulse beat caused by the air blower is also generated in the whole of the air-conditioning duct.

Figure 8:
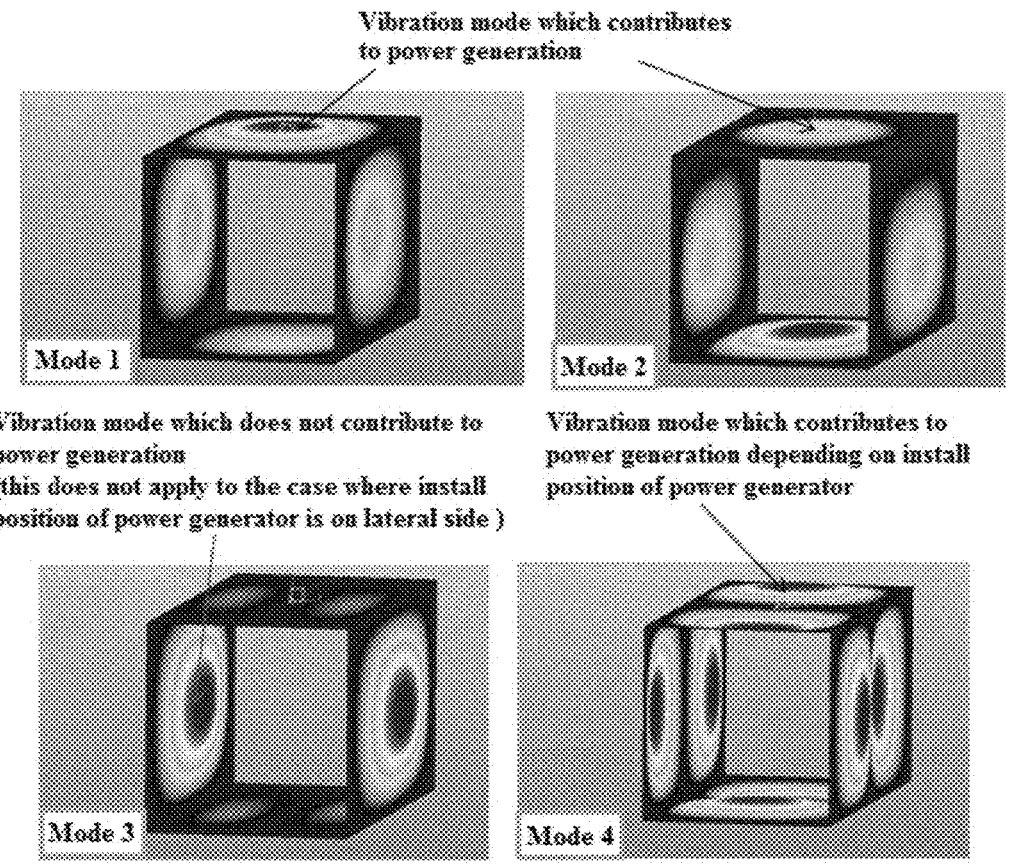
FIG. 8 is a view showing a representative example of an analysis result for a natural frequency of each lateral surface (each vibrating surface) of an air-conditioning duct obtained by modeling the air-conditioning duct having a typical size.

Next, the air-conditioning duct having a typical size is modeled to simulate the natural frequency of the air-conditioning duct. Table 1 is a table showing simulation results. FIG. 8 is a view showing a representative example of an analysis result.

TABLE 1

|  | No. 1 | No. 2 | No. 3 | No. 4 | No. 5 | No. 6 | No. 7 | No. 8 | No. 9 | No. 10 |
|---|---|---|---|---|---|---|---|---|---|---|
| Vertical size (mm) | 400 | 300 | 350 | 400 | 300 | 350 | 400 | 300 | 350 | 400 |
| Horizontal size (mm) | 400 | 300 | 400 | 400 | 300 | 400 | 400 | 300 | 400 | 400 |
| Length between flanges | 1800 | 1800 | 1800 | 900 | 900 | 900 | 450 | 450 | 450 | 1800 |
| Thickness of plate (mm) |  | 1 |  |  | 0.8 |  |  | 0.6 |  |  |
| Mass point (g) |  |  |  |  | 400 |  |  |  |  |  |
| Natural frequency 1 (Hz) | 15 | 25 | 16 | 14 | 21 | 14 | 14 | 18 | 14 | 7 |
| Natural frequency 2 (Hz) | 19 | 30 | 21 | 19 | 30 | 20 | 23 | 31 | 24 | 11 |
| Natural frequency 3 (Hz) | 21 | 32 | 22 | 22 | 33 | 26 | 25 | 35 | 28 | 12 |
| Natural frequency 4 (Hz) | 24 | 38 | 25 | 25 | 36 | 26 | 28 | 42 | 31 | 14 |

Figure 9:
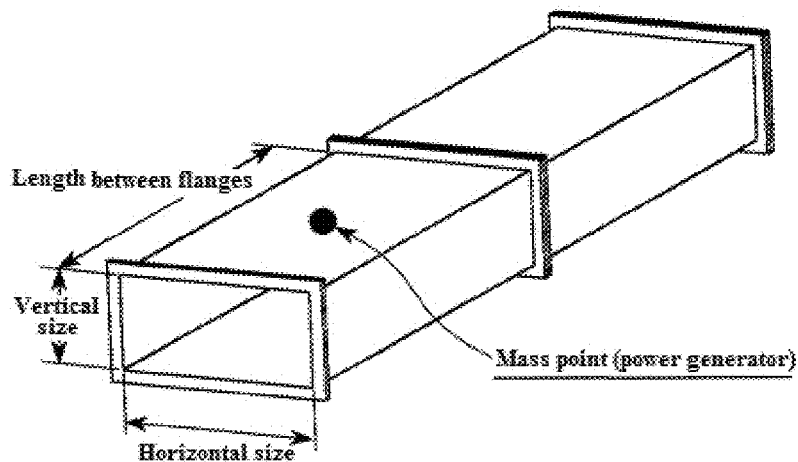
FIG. 9 is a perspective view showing a typical air-conditioning duct to which the power generator of the present invention should be attached.

FIG. 9 is a perspective view showing a typical air-conditioning duct to which the power generator 100 of the present invention should be attached.

As shown in FIG. 9, the size of the air-conditioning duct used under a roof of the building facility or the like has a vertical size of about 300 to 400 mm, a horizontal size of about 300 to 400 mm and a length between flanges of about 900 to 1,800 mm. In this regard, in the case where a passage of the air-conditioning duct is curved or turned according to a structure of the building, the passage of the air-conditioning duct may take any other shape than a linear shape and the length of flanges may be about 400 mm. Thus, with considering such a case, a model in which the length between flanges is set to be about 450 mm was also simulated.

A thickness of a steel plate to be used for the air-conditioning duct may be any one of 0.5 mm, 0.6 mm, 0.8 mm, 1.0 mm, 1.2 mm or the like. The thickness of the steel plate is appropriately selected depending on the size of the air-conditioning duct. Thus, the thickness of the steel plate was appropriately selected depending on the size of the modeled air-conditioning duct (No. 1 to 9 in table 1). In addition, a case of assuming that a large and long air-conditioning duct which is formed of a very thin steel plate is used for reducing the weight of the air-conditioning duct (No. 10 in table 1) was also modeled to simulate it.

As a result, it has been found that the natural frequencies of the air-conditioning duct of No, 1 to 9 in directions (resonant modes) contributing to the power generation are distributed in the range of 14 to 42 Hz. In this specification, the direction (resonant mode) contributing to the power generation means a vibration direction of the air-conditioning duct when the air-conditioning duct is vibrated in a power generation direction thereof such as mode 1 or 2 in FIG. 8. Further, assuming that the power generator 100 is attached to a lateral surface of the air-conditioning duct, a vibration mode which occurs in the lateral surface of the air-conditioning duct such as mode 3 in FIG. 8 contributes to the power generation of the power generator 100.

In the case where the power generator 100 is attached to a center of the surface of the air-conditioning duct corresponding to a node of the vibration, the vibration of the air-conditioning duct such as mode 4 in FIG. 8 does not contribute to the power generation. On the other hand, in the case where the power generator 100 is attached to a region of the surface of the air-conditioning duct corresponding to an antinode of the vibration, the vibration of the air-conditioning duct such as mode 4 in FIG. 8 contributes to the power generation of the power generator 100. In this regard, a kind, an order and a frequency of mode in the models of the air-conditioning duct are different from each model. Thus, the mode number in the above description is not common with each model of the air-conditioning duct.

In the case of the air-conditioning duct of No 10 (the large and thin air-conditioning duct), its natural frequency is low (about 6 Hz). Such an air-conditioning duct can be considered as a forced vibration model at a frequency higher than its resonance frequency. Namely, in this case, the vibrating surface of the air-conditioning duct acts so as to suppress amplitude of the vibration caused by the pulse beat, thus amplification due to the resonance does not occur. However, since the vibrating surface of the air-conditioning duct is thin and has a large area, its spring constant is low and its area to which the pulse beat is applied is large. Thus, a conversion rate from pressure to force of the vibrating surface of the air-conditioning duct becomes large. As a result, its displacement amount becomes also large. In this case, the vibrating surface of the air-conditioning duct takes a vibration mode significantly depending on a pulse beat frequency of the air blower.

From the above description, it has been found that the frequency band in which the vibration of the air-conditioning duct strongly occurs is 14 to 42 Hz as shown in the bold type in table 1. This results from the influence of the natural frequency of the air-conditioning duct at the case of using the pulse beat frequency of the air blower as the vibration source.

Thus, by configuring the power generator 100 so that each of the first natural frequency $\omega_1$ of the first vibration system and the second natural frequency $\omega_2$ of the second vibration system is in the range of 14 to 42 Hz, it is possible to allow the power generator 100 (the power generating unit 10) to efficiently utilize the vibration of the air-conditioning duct to generate the electric power with high power generation efficiency.

Further, a sensitivity band (a frequency band contributing to the power generation of the power generator 100) of the power generator 100 preferably contains the range of 15 to 28 Hz in which the vibration is likely to be amplified due to synchronization of the pulse beat frequency of the duct and the natural vibration frequency (natural frequency). Further, it has been found by research and study of the inventors that the power generator 100 shows a tendency that variation in the power generation amount of the power generator 100 in the sensitivity band becomes likely to occur (be wide) in the case of making a difference (distance) between the first natural frequency $\omega_1$ and the second natural frequency $\omega_2$ larger in order to broaden the sensitivity band of the power generator 100.

From the reasons stated above, it is preferable that the power generator 100 (the power generating unit 10) is configured so that the frequency band between the first natural frequency $\omega_1$ of the first vibration system and the second natural frequency $\omega_2$ of the second vibration system contains the frequency band of 15 to 28 Hz and the difference between the first natural frequency $\omega_1$ and the second natural frequency $\omega_2$ does not become too large (that is, the difference is preferably in the range of 14 to 38 Hz). Specifically, it is preferable that the power generator 100 has the natural frequency $\omega_1$ at 14 Hz as a primarily side (low-frequency side) natural frequency and the second natural frequency $\omega_2$ in the range of 28 to 38 Hz as a secondary side (high-frequency side) natural frequency. This makes it possible to suppress the variation in the power generation amount of the power generator 100 with keeping a sufficiently-high power generation amount of the power generator 100. Specifically, it is possible to suppress the variation of the power generation amount of the power generator 100 to be about 12%. As a result, it is possible to generate the electric power with higher power generation efficiency.

As described above, each natural frequency $\omega_1$, $\omega_2$ is determined by the three parameters (the first natural angular frequency $\Omega_1=(k_1/m_1)^{1/2}$ of the first vibration system, the second natural angular frequency $\Omega_2=(k_2/m_2)^{1/2}$ of the second vibration system and the mass ratio $\mu=m_2/m_1$ of the first mass portion and the second mass portion).

These three parameters are preferably determined so that "$\Omega_1$" is in the range of 200 to 250 rad/S, "$\Omega_2$" is in the range of 60 to 120 rad/S and "$\mu$" is in the range of 0.4 to 1, and more preferably determined so that "$\Omega_1$" is in the range of 210 to 240 rad/S, "$\Omega_2$" is in the range of 80 to 110 rad/S and "$\mu$" is in the range of 0.5 to 0.7. This makes it possible to reliably set each natural frequency $\omega_1$, $\omega_2$ of the power generator 100 to fall within the above range and prevent occurrence of the variation in the power generation amount of the power generator 100 in a broad sensitivity band. Thus, the power generator 100 can efficiently utilize the vibration of the air-conditioning duct to generate the electric power with higher power generation efficiency.

It is preferable that the power generator 100 having such a configuration is configured so that the power generator 100 shows a high power generation amount (high power generation capacity) in the vicinities of the first resonance frequency $f_1$ and the second resonance frequency $f_2$ and a difference between a power generation amount in the vicinity of the first resonance frequency $f_1$ and a power generation amount in the vicinity of the second resonance frequency $f_2$ becomes as small as possible as shown in FIG. 7. Further, it is more preferable that the power generator 100 is configured so that the variation in the power generation amount in a frequency band between the resonance frequencies $f_1$, $f_2$ also becomes as small as possible. With such a configuration, the power generator 100 can efficiently generate the electric power in the sensitivity band.

Specifically, when the power generation amount at the first resonance frequency $f_1$ is defined as "$A_1$" [mW/100 mG] and the power generation amount at the second resonance frequency $f_2$ is defined as "$A_2$" [mW/100 mG], it is preferable that the power generator 100 is configured so that "$A_1$" and "$A_2$" satisfy a relationship of $0.9A_2 \leq A_1 1.1A_2$, and it is more preferable that the power generator 100 is configured so that "$A_1$" and "$A_2$" satisfy a relationship of $0.95A_2 \leq A_1 \leq 1.05A_2$.

Further, when a minimum power generation amount in the frequency band between the first resonance frequency $f_1$ and the second resonance frequency $f_2$ is defined as "$A_3$" [mW/100 mG], it is preferable that the power generator 100 is configured so that "$A_1$", "$A_2$" and "$A_3$" satisfy a relationship of $0.8[(A_1+A_2)/2] \leq A_3 \leq 0.9[(A_1+A_2)/2]$, and it is more preferable that the power generator 100 is configured so that "$A_1$", "$A_2$" and "$A_3$" satisfy a relationship of $0.8[(A_1+A_2)/2] \leq A_3 \leq 0.85[(A_1+A_2)/2]$.

In the power generator 100, each of the power generation amounts $A_1$, $A_2$ at each resonance frequency $f_1$, $f_2$ is preferably in the range of about 0.6 to 1.5 mW/1.00 mG, and more preferably in the range of about 0.7 to 1.2 mW/100 mG. If the power generator 100 can utilize the vibration of the air-conditioning duct to generate the electric power in the power generation amount in the above range, it is possible to effectively utilize the power generator 100 in the following power generation system, for example.

Specifically, by combining the power generator 100 with a sensor and a wireless device, it is possible to obtain the power generation system described above. In the power generation system, by utilizing the electric power generated by the power generator 100 as a power source, the sensor can get measured data such as illumination intensity, temperature, humidity, pressure, noise and the like in the facility or the air-conditioning duct and then transmit the measured data to an external device through the wireless device. The external device can use the measured data as various control signals or a monitoring signal.

The minimum power generation amount $A_3$ in the frequency band between the resonance frequencies $f_1$, $f_2$ is preferably in the range of about 0.5 to 1 mW/100 mG, and more preferably in the range of about 0.6 to 0.9 mW/100 mG. This allows the power generator 100 to provide a high power generation amount in the frequency band between the resonance frequencies $f_1$, $f_2$, thereby utilizing the power generator 100 in the above-mentioned power generation system, for example.

As described above, from the view point of efficiently generating the electric power over a broad frequency band, it is preferable that the power generator 100 is configured so that the minimum power generation amount $A_3$ [mW/100 mG] in the frequency band between the resonance frequencies $f_1$, $f_2$ is in the range of $0.8[(A_1+A_2)/2]$ [mW/100 mG] to $0.9[(A_1+A_2)/2]$ [mW/100 mG].

On the other hand, in the case where the power generator 100 is configured so that the power generation amount $A_3$ [mW/100 mG] is equal to or more than $0.25[(A_1+A_2)/2]$ [mW/100 mG] but less than $0.8[(A_1+A_2)/2]$ [mW/100 mG], it is possible to provide the following effect. Namely, by making a value of the power generation amount $A_1$ or $A_2$ larger with respect to the power generation amount $A_3$, in other words, by making a power generation amount on at least one end of the sensitivity band larger, it is possible to improve sensitivity of the power generator 100 with respect to vibration having a frequency which is slightly out of the sensitivity band (a frequency lower than the first resonance frequency $f_1$ or a frequency higher than the second resonance frequency $f_2$). This makes it possible to broaden an apparent sensitivity band of the power generator 100.

The relationship of the power generation amounts described above can be properly adjusted by setting values of the three parameters ($\Omega_1$, $\Omega_2$ and $\mu$) to fall within the above ranges and setting damping coefficients $C_2$ respectively corresponding to the natural frequencies $\omega_1$, $\omega_2$. In the power generator 100 of this embodiment, the damping coefficient $C_2$ can be expressed by the following equation (2).

[Equation (2)]

$$c_2 = \frac{k_t^2}{\sqrt{R^2 + (2\pi L f)^2}} \quad (2)$$

(wherein "$k_t$" is a thrust coefficient, "R" is a coil resistance value and "L" is coil inductance)

The coil resistance value R and the coil inductance L determining the damping coefficient $C_2$ expressed by the above equation (2) can be adjusted by changing a constituent material, a wire diameter, a winding number or the like of the wire for forming the coil 41.

The damping coefficient $C_2$ expressed by the above equation (2) and corresponding to the first natural frequency $\omega_1$ is preferably in the range of 6 to 10 [N/(m/s)], and more preferably in the range of 7 to 9 [N/(m/s)]. The damping coefficient $C_2$ corresponding to the second natural frequency ail is preferably in the range of 6 to 10 [N/(m/s)], and more preferably in the range of 7 to 9 [N/(m/s)].

In the case where the damping $C_2$ satisfies the above conditions, it is possible to make the power generation amounts $A_1$, $A_2$ at the two resonance frequencies $f_1$, $f_2$ to be substantially equal to each other and set the power generation amount $A_3$ to be about 80 to 85% of the power generation amount $A_1$, $A_2$. Namely, the power generator 100 can highly keep the power generation amount over a sufficiently-broad frequency band and it is possible to suppress the variation in the power generation amount to be small. As a result, the power generator 100 can efficiently utilize the vibration of the air-conditioning duct to generate the electric power with higher power generation efficiency.

As shown in FIG. 4, in the power generator 100, when the vibration is transmitted from the air-conditioning duct to the housing 20, the power generating unit 10 is vibrated in the housing 20 in the vertical direction. More specifically, the coil assembly 40 is vibrated relative to the housing 20 through the first spring portions 64 of the leaf springs 60U, 60L in the vertical direction (namely, the first vibration system is vibrated). In the same manner, the magnet assembly 30 is vibrated relative to the coil assembly 40 through the second spring portions 65 of the leaf springs 60U, 60L in the vertical direction (namely, the second vibration system is vibrated).

Each of the leaf springs 60U, 60L has a lateral spring constant in a lateral direction (lateral direction) perpendicular to the vibrating direction of the spring portions 64, 65. The lateral spring constant is structurally larger than the spring constant in the vibrating direction of the spring portions 64, 65. Namely, each of the leaf springs 60U, 60L has a longitudinal stiffness in a thickness direction thereof and a lateral stiffness in the lateral direction larger than the longitudinal stiffness. Thus, each of the leaf springs 60U, 60L is more likely to be distorted or deformed in the thickness direction (vibrating direction) than the lateral direction. Further, both ends in the thickness direction of each of the magnet assembly 30 and the coil assembly 40 are coupled with the leaf springs 60U, 60L. Thus, the magnet assembly 30 and the coil assembly 40 can be vibrated together with the leaf springs 60U, 60L.

For the reasons stated above, it is possible to prevent the magnet assembly 30 and the coil assembly 40 from being vibrated in the lateral direction substantially perpendicular to the thickness direction of the leaf springs 60U, 60L (lateral motion) and being rotated (rolling motion). This makes it possible to restrict a vibrational axis of the magnet assembly 30 and the coil assembly 40 to a specific direction (the vertical direction). Further, as described above, the coil 41 is disposed so as not to contact with the magnet assembly 30 (the permanent magnet 31, the yoke 33 and the back yoke 32).

Thus, it is possible to prevent the magnet assembly 30 and the coil 41 from contacting with each other while the power generating unit 10 is vibrated. In particular, since both of the magnet assembly 30 and the coil assembly 40 have a high stiffness, both of the magnet assembly 30 and the coil assembly 40 also have a high lateral stiffness in the lateral direction perpendicular to the vibrating direction as well as the spring portions 64, 65 of the leaf springs 60U, 60L. Thus, it is possible to reliably prevent the magnet assembly 30 and the coil 41 from contacting with each other while the power generating unit 10 is vibrated.

This makes it possible to efficiently transmit vibration energy from the air-conditioning duct to the first vibration system and then further efficiently transmit the transmitted vibration energy of the first vibration system to the second vibration system. As a result, a relative displacement between the magnet assembly 30 and the coil 41 is reliably performed. A magnetic field loop is formed in the power generating unit 10 so that the lines of magnetic force flows from a center to a periphery of the permanent magnet 31 through the yoke 33 and then flow to the center of the permanent magnet 31 through the back yoke 32 as show in FIG. 4.

Thus, the magnetic field having magnetic flux density B (the magnetic field loop) generated from the permanent magnet 31 is changed in the coil 41 due to the relative displacement between the magnet assembly 30 and the coil 41. This change of such magnetic flux density B induces electromotive force in the coil 40 due to Lorentz force acting on electrons in the coil 41 through which the magnetic field passes. The electromotive force directly contributes to the power generation of the power generating unit 10. Thus, the power generating unit 10 can efficiently generate the electric power.

In the power generating unit 10, a clearance between the first spring portions 64 of the upper leaf spring 60U and the first spring portions 64 of the lower leaf spring 60L may be set so that a clearance at one side close to the cylindrical portion 22 of the housing 20 is substantially equal to or different from a clearance at another side close to the coil holding portion 50. In the same manner, a clearance between the second spring portions 65 of the upper leaf spring 60U and the second spring portions 65 of the lower leaf spring 60L may be set so that a clearance at one side close to the coil holding portion 50 is substantially equal to or different from a clearance at another side close to the magnet assembly 30 (the spacer 70).

In a case where the clearances are set so as to vary from the one side to the other side, it is possible to add pre-tensions in the vertical direction to the first spring portions 64 and/or the second spring portions 65 in a state that the power generating unit 10 is not vibrated. In such a configuration, postural changes of the power generating unit 10 caused at the time of horizontally (situation shown in FIG. 12(a)) or vertically (situation shown in FIG. 12(b)) mounting the power generator 100 on the vibrating body are suppressed. Therefore, the power generator 100 can efficiently generate the electric power regardless of installation locations for the power generator 100.

The attachment 9 is provided on a lower surface (the other surface opposite to the one surface on which the power generating unit 10 is disposed) of the base (the support board) 23 of the above-mentioned main unit 1. By attaching the attachment 9 to the air-conditioning duct, it is possible to fixedly attach the main unit 1 (the power generator 100) to the air-conditioning duct.

<<Attachment 9>>

Figure 10:
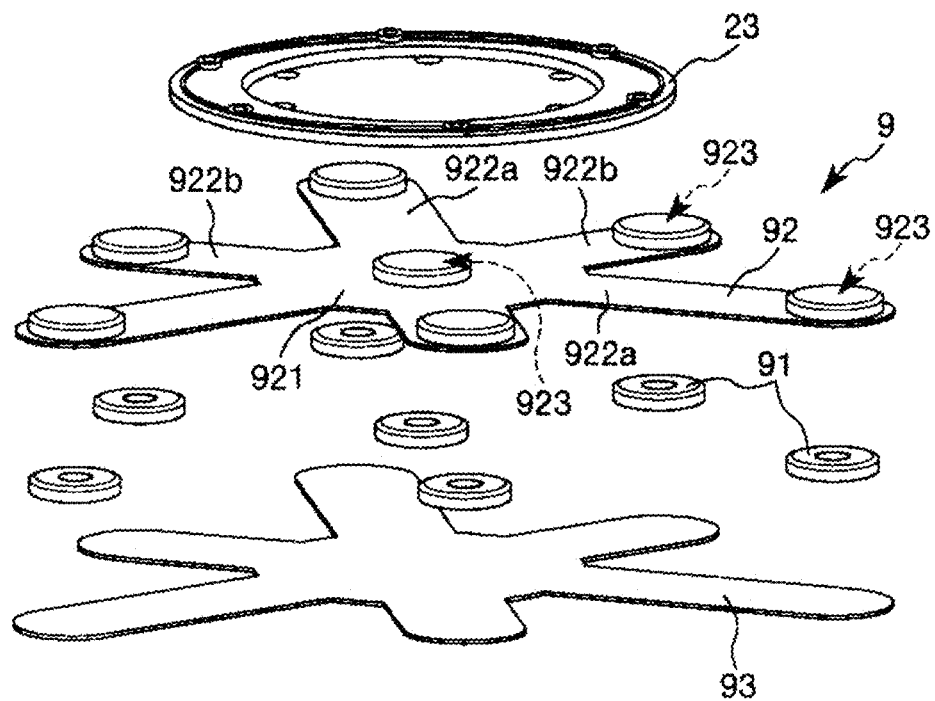
FIG. 10 is an exploded perspective view showing an attachment included in the power generator shown in FIG. 1.
Figure 11:
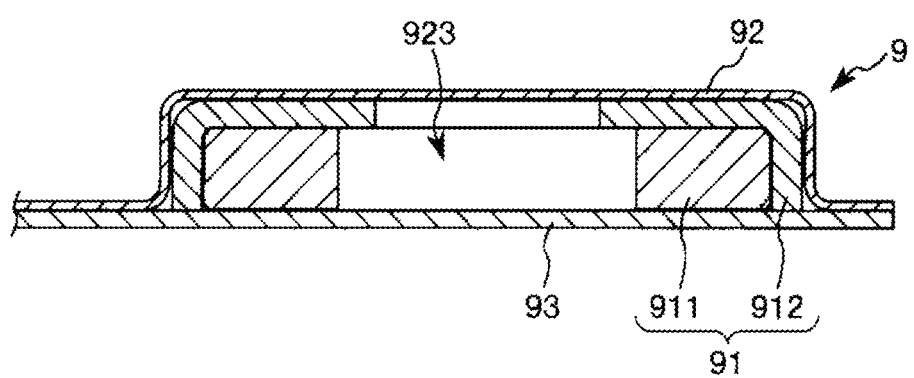
FIG. 11 is a cross-sectional view taken along a B-B line in FIG. 1.
Figure 12:
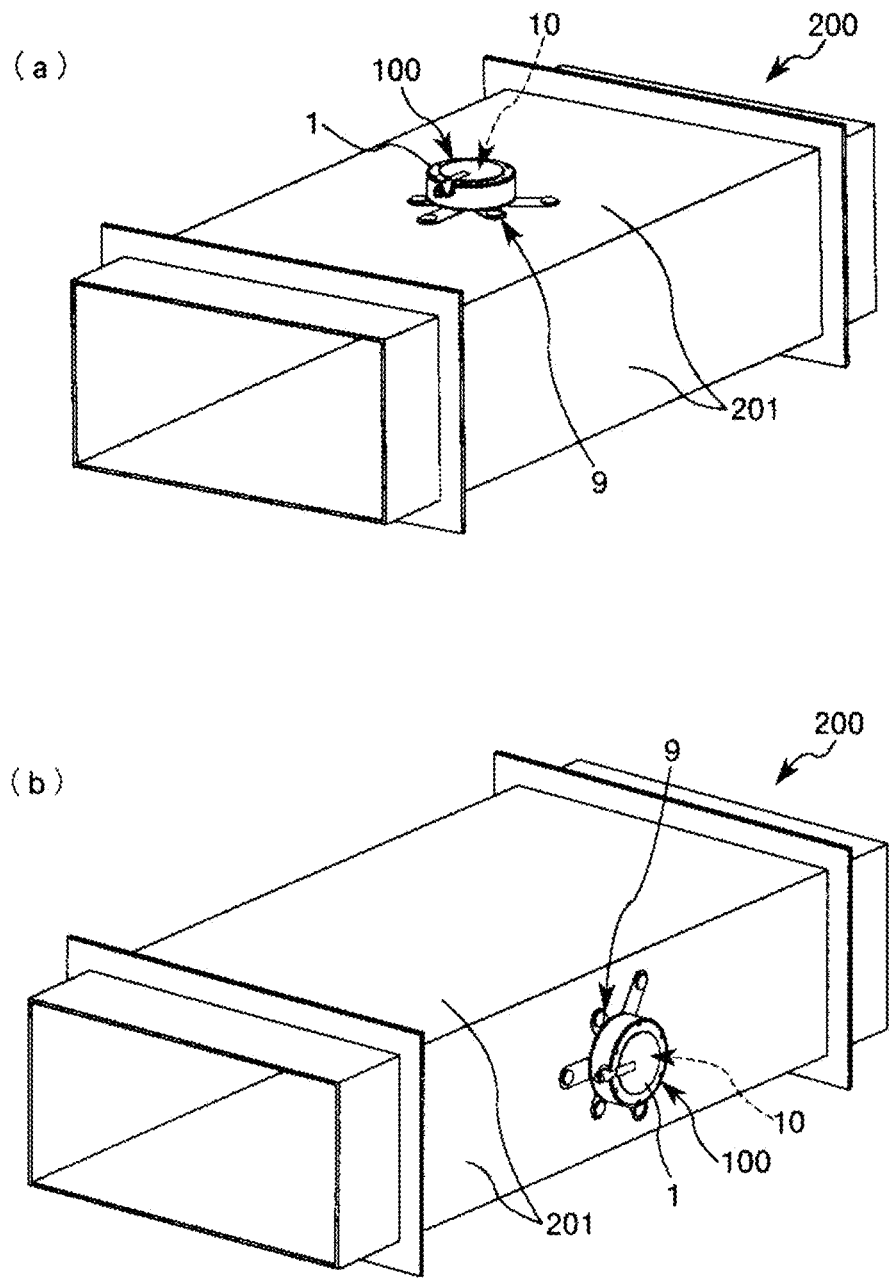
FIG. 12 is a view showing a usage state (attached state) of the power generator shown in FIG. 1.
Figure 13:
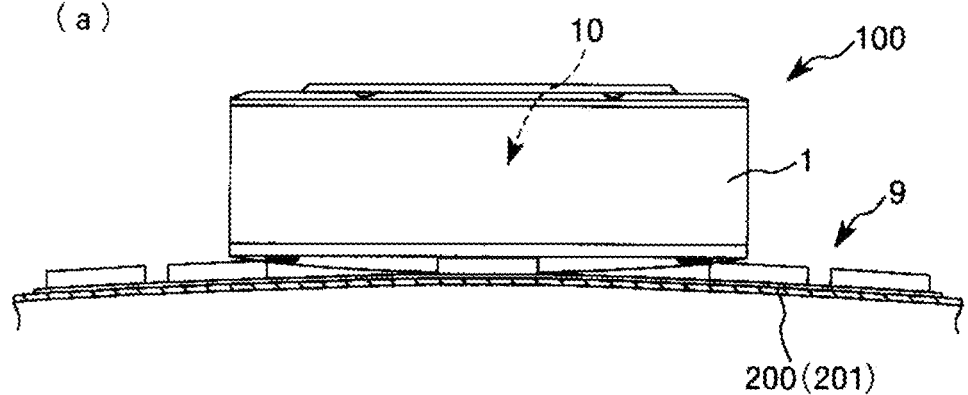
FIG. 13 is an enlarged side view showing the power generator shown in FIG. 12.
Figure 13:
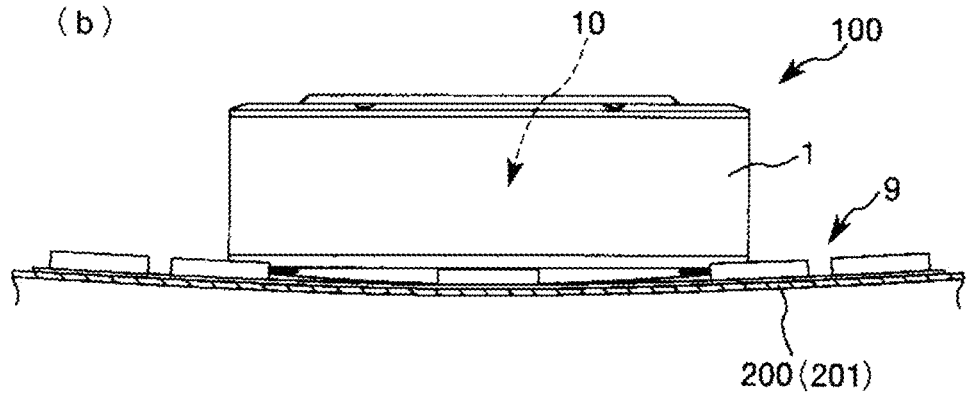
Figure 14:
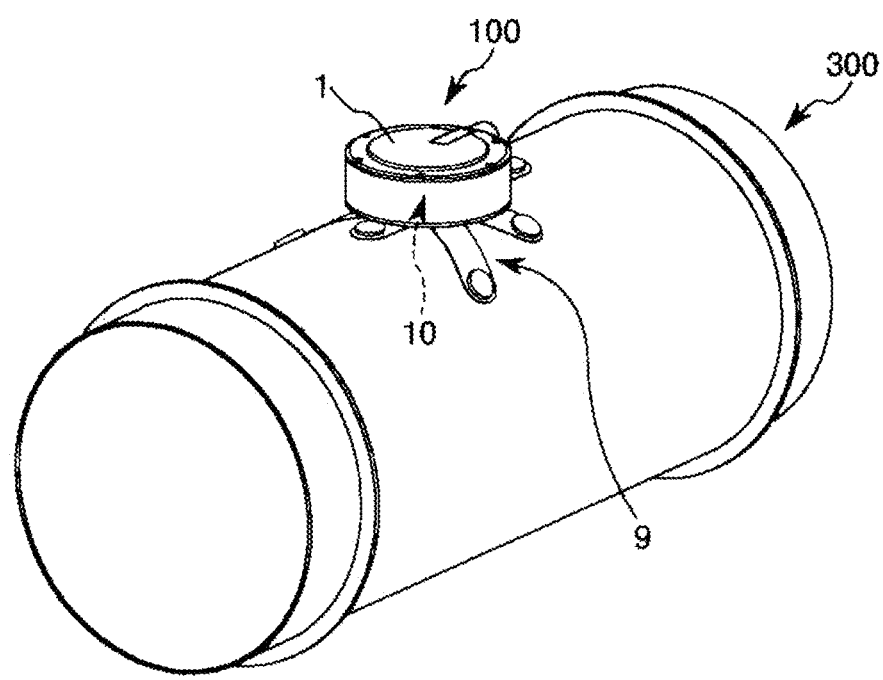
FIG. 14 is a view showing another usage state (attached state) of the power generator shown in FIG. 1.

FIG. 10 is an exploded perspective view showing an attachment included in the power generator shown in FIG. 1, FIG. 11 is a cross-sectional view taken along a B-B line in FIG. 1. FIG. 12 is a view showing a usage state (attached state) of the power generator shown in FIG. 1. FIG. 13 is an enlarged side view showing the power generator shown in FIG. 12. FIG. 14 is a view showing another usage state (attached state) of the power generator shown in FIG. 1.

Hereinafter, an upper side in each of FIGS. 10 to 14 is referred to as "upper" or "upper side" and a lower side in each of FIGS. 10 to 14 is referred to as "lower" or "lower side".

As shown in FIGS. 10 and 11, the attachment 9 has a plurality of magnet assemblies 91 (in this embodiment, the number of the assemblies 91 is seven), a first sheet member 92 for holding the magnet assemblies 91 and a second sheet member 93 provided on one side of the magnet assemblies 91 opposed to another side of the magnet assemblies 91 on which the main unit 1 is provided.

Each of the magnet assemblies 91 has a small permanent magnet (magnet block) 911 having a ring shape; and a bottomed cylindrical yoke 912 having a bottom plate (an upper plate), a through-hole formed in the bottom plate (the upper plate) and a peripheral portion upwardly extending from the bottom plate (the upper plate). Each of the permanent magnets 911 is attached to an inner side of the yoke 912 defined by the bottom plate and the peripheral portion by magnetic force (attraction force) of each of the permanent magnets 911, an adhesive agent or the like. The magnet assembly 91 having such a yoke 912 can increase the attraction force of the permanent magnet 911.

The permanent magnet 911 is not particularly limited to a specific type, as long as the permanent magnet 911 can provide enough attraction force. The permanent magnet 911 may be identical to the permanent magnet 31 explained above, for example. By using such a permanent magnet 911, it is possible to fixedly attach the power generator 100 to a vibrating body with the enough attraction force (fixed power) regardless of the constituent material of the air-conditioning duct. Further, it is possible to make a process for removing the power generator 100 from the vibrating body easy. Namely, it is possible to easily and reliably remove the power generator 100 from the vibrating body.

As a constituent material of the yoke 912, a soft magnetic material having a high saturated magnetic flux is preferably used. In the case of forming the yoke 912 by a press molding, a plate material obtained by plating a base material formed of an iron-based material is preferably used for the yoke 912. Examples of the plate material include a zinc plating steel plate, a tin plating steel plate and a nickel plating steel plate.

These magnet assemblies 91 are mounted to the lower surface 230 of the base 23 through the first sheet member (mounting mechanism) 92. As shown in FIG. 10, the first sheet member 92 has a fixed portion 921 fixed to the base 23 of the main unit 1 and having a substantially circular shape and a plurality of arm portions 922 integrally formed with the fixed portion 921 so as to outwardly extend from the fixed portion 921. The fixed portion 921 is fixed to the base 23 by an adhesive agent or the like.

Concave portions (holding portions) 923 for holding the magnet assemblies 91 are formed on a central portion of the fixed portion 921 and another end portion of each of the arm portions 922 opposed to one end portion integrally formed with the fixed portion 921. The magnet assemblies 91 is held in each of the concave portion 923 and fixed to the fixed portion 921 or the and portion 922 by an adhesive agent or the like. In the assembled state, the magnet assembly 91 held in the concave portion 923 of the fixed portion 921 is received (located) in the concave portion 235 of the base 23.

The first sheet member 92 has flexibility. This makes it possible to displace the magnet assemblies 91 (permanent magnets 911) held in the concave portions 923 formed on the arm portions 922 in the thickness direction of the base 23. As shown in FIG. 2, each of the arm portions 922 has a length allowing the concave portions 923 (magnet assemblies 91) to locate outside of the main unit 1 in a planar view when the power generator 100 is attached to a planation surface.

This makes it possible to reduce a stiffness of each of the arm portions 922 in a direction in which the arm portions 922 come closer to each other and in a torsional direction around a longitudinal direction of each of the arm portions 922 without reducing tensile stiffness of each of the arm portions 922 in the longitudinal direction of each of the arm portions 922. As a result, even in the case where the power generator 100 is fixedly attached to a vibrating body having a curved surface (curved portion) such as a round-shaped duct 300 shown in FIG. 14, it is possible to stably and fixedly attach the main unit 1 to the vibrating body.

The arm portions 922 are arranged along an circumferential direction of the fixed portion 921 at substantially regular intervals (at regular angular-intervals of about 60 degree) Namely, three of the magnet assemblies 91 (the permanent magnets 911) are arranged so as to be rotationally symmetric with each other. This makes it possible to fixedly attach the main unit 1 to the vibrating body by attraction force uniformly along the circumferential direction thereof. Thus, it is possible to prevent the power generator 100 from sliding (moving) to a specific direction due to the vibration of the vibrating body Namely, it is possible to keep the power generator 100 in an attached position on the vibrating body even in the case where the vibrating body is vibrated.

In particular, the arm portions 922 in this embodiment include a plurality of first arm portion 922a respectively having a first length and a plurality of second arm portion 922b having a second length shorter than the first length of the first arm portion 922a. Each of the second arm portions 922b is arranged between the first arm portions 922a. This makes it possible to enhance fixing strength (holding strength) of the main unit 1 relative to a vibrating body having a curved surface with a relatively small radius of curvature by the first arm portions 922a and enhance fixing strength of the main unit 1 relative to a vibrating body having a curved surface with a relatively large radius of curvature by the second arm portions 922b. Namely, by using the arm portions 922 having such a configuration, it is possible to stably and fixedly attach the main unit 1 (power generator 100) to the vibrating body regardless of the shape and the size of the vibrating body.

A length from the central portion of the fixed portion 921 to the other end portion of each of the first arm portions 922a is not particularly limited to a specific value, but preferably in the range of about 1.8 to 4 times of a radius of the base 23, and more preferably in the range of about 2 to 3.5 times of the radius of the base 23. On the other hand, a length from the central portion of the fixed portion 921 to the other end portion of each of the second arm portions 922b is not particularly limited to a specific value, but preferably in the range of about 1:2 to 2.5 times of the radius of the base 23, and more preferably in the range of about 1.2 to 2 times of the radius of the base 23.

As the first sheet member 92, a sheet member having high flexibility (softness), bendability and tensile strength is preferably used. Examples of a constituent material of the first sheet member 92 include a film such as a polyester film, a polyethylene film, a polypropylene film and a polyvinyl chloride film; and a woven fabric obtained by weaving a fiber of these polymer materials.

An average thickness of the first sheet member 92 is not particularly limited to a specific value, but preferably in the range of about 0.01 to 1.0 mm, and more preferably in the range of about 0.03 to 0.1 mm. Since the first sheet member 92 having the above average thickness has superior flexibility and bendability regardless of the constituent material of the first sheet member 92, it is possible to prevent the first sheet member 92 from encumbering the vibration of the vibrating body when the vibrating body is vibrated. As a result, it is possible to prevent or suppress efficiency reduction of the power generation of the power generator 100.

The second sheet member 93 having a shape substantially identical to that of the first sheet member 93 is bonded (laminated) to a lower surface of the first sheet member 92. Examples of a method for bonding the second sheet member 93 to the first sheet member 92 include a fusion bonding (a thermal fusion bonding, an ultrasonic fusion bonding or a high frequency fusion bonding) and an adhesion using an adhesive agent.

The second sheet member 93 has a function of preventing a slide of the main unit 1 relative to the vibrating body in a state that the main unit 1 is fixedly attached to the vibrating body. Since the attachment 9 has the second sheet member 93, it is possible to reliably prevent the main unit 1 from sliding relative to the vibrating body even in the case where the vibrating body is strongly vibrated.

As the second sheet member 93, a sheet member which has a high frictional coefficient and can be deformed according to a plurality of micro concavities and convexities on the vibrating body is preferably used. For example, an elastomer material (rubber material) having a hardness in the range of about 10 to 100 is preferably used as a constituent material for the second sheet member 93. Such an elastomer material is not particularly limited to a specific material, but examples of such an elastomer material include a butyl rubber, a styrene-butadiene rubber, a nitrile rubber, an acrylic rubber, a silicon rubber, a fluororubber, an urethane rubber and an a combination of two or more of the above materials.

Among these materials, an elastomer material having a low hardness is preferably used. The second sheet member 93 formed of such an elastomer material can provide high adherence property. Further, by using such an elastomer material for the second sheet member 93, it is possible to set the frictional coefficient of the second sheet member 93 preferably equal to or more than 0.7, and more preferably equal to or more than 0.85.

An average thickness of the second sheet member 93 is not particularly limited to a specific value, but preferably in the range of about 0.1 to 2.0 mm, and more preferably in the range of about 0.3 to 1.0 mm. Since the second sheet member 93 having the above average thickness has superior flexibility and bendability regardless of the constituent material of the second sheet member 93, it is possible to prevent or suppress degradation of the flexibility (the softness and the bendability) of the first sheet member 92 in a state that the second sheet member 93 is bonded (laminated) to the first sheet member 92.

Since the power generator 100 is fixedly attached to the air-conditioning duct due to the attachment 9 explained above, it is possible to make a contacting area between the power generator 100 and the air-conditioning duct large. Thus, it is possible to efficiently transmit the vibration from the air-conditioning duct to the power generator 100 through the attachment 9, thereby allowing the power generator 100 to efficiently utilize the vibration of the air-conditioning duct to generate the electric power with high power generation efficiency.

The power generator 100 as described above is used in a state that the power generator 100 is fixedly attached to an air-conditioning duct formed of a magnetic material such as a rectangular-shaped duct 200 shown in FIG. 12 and a round-shaped duct (pipe-type duct) 300 shown in FIG. 14.

The rectangular-shaped duct 200 shown in FIG. 12 has a square tube shape formed by four deformable plates 201. The rectangular-shaped duct 200 is formed by, for example, bending and welding a plate material formed of a magnetic material (examples of the plate material include a steel plate and a plated steel plate). Such a rectangular-shaped duct 200 is used for forming a flow channel of a device for delivering (emitting, ventilating, inspiring or circulating) gas such as steam and air.

For example, the rectangular-shaped duct (air-conditioning duct) 200 which is installed in a facility such as a big center, building and station has a function of an air-channel in which air flows for air-ventilation or air-release by an air blower. At the time of passing the air in the rectangular-shaped duct 200 due to the air blower, an air-turbulence is caused due to variation (pulsing beat) of air-pressure by the air blower and/or a movement of the air (fluid) in the rectangular-shaped duct 200. Such an air-turbulence vibrates the rectangular-shaped duct 200. Further, positive pressure or negative pressure is added to an inner side of the rectangular-shaped duct 200 by the action of the air blower. By such pressures in addition to the vibration of the rectangular-shaped duct 200 due to the air-turbulence, the plates 201 are deformed. Specifically, in the case where the positive pressure is added to the inner side of the rectangular-shaped duct 200, the plates 201 are deformed so as to extend toward the outside of the rectangular-shaped duct 200 (so as to form a convex surface) as shown in FIG. 13(*a*). On the other hand, in the case where the negative pressure is added to the inner side of the rectangular-shaped duct 200, the plates 201 are deformed so as to extend toward the inner side of the rectangular-shaped duct 200 (so as to form a concave surface) as shown in FIG. 13(*b*). By such deformations of the plates 201, the vibration of the rectangular-shaped duct 200 is amplified.

According to the present invention, the magnet assemblies 91 are mounted to the main unit 1 through the first sheet member 92 having the flexibility. Thus, even in the case where a plurality of concavities and convexities are formed on a surface of the plate 201 (a surface to which the power generator 100 should be fixedly attached), the first sheet member 92 can absorb the concavities and the convexities because the first sheet member 92 has the flexibility enough for deforming according to the concavities and the convexities of the plate 201. Therefore, it is possible to reliably and fixedly attach the attachment 9 to the plate 201 regardless of a surface profile of the plate 201. In addition, as described above, even in the case where the plate 201 is deformed so as to form the convex surface (see FIG. 13(*a*)) or the concave surface (see FIG. 13(*b*)), the first sheet member 92 can be deformed according to the deformation of the plate 201. Thus, an attached state of the attachment 9 with respect to the plate 201 is kept, thereby it is possible to reliably prevent the power generator 100 from undesirably removing from the duct rectangular-shaped 200.

In this embodiment the lower surface 230 of the base 23 is a curved convex surface having a convex portion in the center of the lower surface 230. Thus, even in the case where the plate 201 is deformed no as to form the concave surface as shown in FIG. 13(*b*), a periphery of the base 23 is unlikely to contact with the plate 201. From such a view point in addition to the above reason, it is possible to reliably prevent the power generator 100 from undesirably removing from the rectangular-shaped duct 200.

Normally, the vibration of the rectangular-shaped duct 200 is unwanted vibration because the vibration of the rectangular-shaped duct 200 results in noise and uncomfortable vibration in the facility. In the present invention, it is possible to generate the electric power by utilizing such unwanted vibration of the rectangular-shaped duct 200 because the main unit 1 is fixedly attached to the rectangular-shaped duct 200 by attaching the attachment 9 to the plate 201. Therefore, in the facility where the rectangular-shaped duct 200 is installed, it is possible to obtain the electric power from the power generator 100 without an external power-supply wire.

For example, by combining the power generator 100 with a sensor and a wireless device, it is possible to obtain the following power generation system. In the power generation system, the power generator 100 acts as an electric power supply. By utilizing the electric power generated by the power generator 100 as a power source, the sensor can get measured data such as illumination intensity, temperature, humidity, pressure, noise and the like in the facility or the rectangular-shaped duct 200 and then transmit the measured data to an external device through the wireless device. The external device can use the measured data as various control signals or a monitoring signal.

As shown in FIG. 12(*a*), the power generator 100 may be fixedly attached to the plate 201 used as an upper will of the rectangular-shaped duct 200. Further, as shown in FIG. 12(*b*), the power generator 100 may be fixedly attached to one of the plates 201 used as a side wall of the rectangular-shaped duct 200.

In this regard, by making the size of the power generator 100 contributing to the power generation larger, that is, by making the weight of the power generator 100 heavier, it is possible to improve the power generation capacity of the power generator 100.

However, in the case where the weight of the power generator 100 increases, there is a problem that material costs of the power generator 100 also increase. Further, in the case where the weight of the power generator 100 is too heavy relative to a mass and a spring constant of the plate 201, the vibration of the plate 201 is suppressed. As a result, the plate 201 is not sufficiently vibrated. In this case, there is a possibility that the power generator 100 cannot provide the electric power in a desired power generation amount.

On the other hand, frequency characteristics of the rectangular-shaped duct 200 (air-conditioning duct) are affected by the weight of the power generator 100 depending on the weight of the power generator 100. For example, as the weight of the power generator 100 increases, the natural frequency of the duct shifts to the low-frequency side and a weight load with respect to the duct increases. At this time, if excitation force from the air blower or the like is constant, the amplitude of the vibration tends to decrease. However, even if the weight of the power generator 100 increases, a phenomenon that the vibration is rather amplified occurs in the case where the natural frequency matches with the pulse beat frequency of a prime mover (the air blower).

As described above, in the power generator 100, it is possible to further optimize by adjusting a balance among an excitation frequency (the pulse beat frequency) of the air blower, the sensitivity band and the natural frequency of the rectangular-shaped duct (air-conditioning duct) 200 with the weight of the power generator 100. Moreover, it is possible to maximize the power generation amount with keeping the weight of the power generator 100 to be minimal necessary.

Specifically, the above effect can be provided by additionally attaching a weight for adjusting the power generation amount to the power generator 100.

In such a configuration, the weight of the power generator 100 is preferably set to be in the range of 200 to 700 g, and more preferably set to be in the range of 350 to 450 g. If the weight of the power generator 100 is in the above range (that is, if the weight of the power generator 100 is relatively-small), it is possible to sufficiently suppress the material costs of the power generator 100 and provide a sufficiently-large power generation amount by additionally attaching the weight to the power generator 100.

The power generation amount of only the power generator 100 (without the weight) attached to the rectangular-shaped duct 200 may be measured and then a weight of the weight may be adjusted according to this measurement result. However, a total weight of the power generator 100 and the weight is preferably equal to or less than 800 g, and more preferably equal to or less than 700 g. By setting the total weight to fall within the above range, it is possible to efficiently utilize the vibration of the rectangular-shaped duct (air-conditioning duct) 200 without significantly suppressing the vibration of the plate 201 of the rectangular-shaped duct 200 due to the power generator 100 and the weight.

Here, the following provides measurement results obtained by measuring power generation amounts in a state that the power generator 100 having a weight of 200 g or 400 g is fixedly attached to the rectangular-shaped duct (air-conditioning duct) 200 and the weight having a different weight is additionally attached to the power generator 100 having each weight. Table 2 shows the sizes of the air-conditioning duct and install positions of the power generator 100. Table 3 shows the measurement results of the power generation amount of the power generator 100 having each weight. In table 2, "distance from air blower" means a distance from the air blower of the air-conditioning duct to the power generator 100. In table 3, "accumulated power generation amount" means an accumulated power generation amount for 8 seconds.

TABLE 2

| Measurement position | Duct size | | | Distance from air blower |
|---|---|---|---|---|
| | Vertical size (mm) | Horizontal size (mm) | Length between flanges (mm) | |
| No. 1 | 400 | 400 | 900 | about 4 m |
| No. 2 | 300 | 300 | 1800 | about 8 m |
| No. 3 | 300 | 400 | 1800 | about 20 m |
| No. 4 | 350 | 400 | 1800 | about 15 m |
| No. 5 | 350 | 400 | 400 | about 8 m |

TABLE 3

Measurement position No. 1

| Weight of product | | Accumulated power generation amount (mJ) | |
|---|---|---|---|
| | | 200 g | 400 g |
| Total weight (weight of product + weight) | 200 g | 0.73 | — |
| | 300 g | 0.80 | — |
| | 400 g | 1.03 | 2.06 |
| | 500 g | 1.73 | 3.45 |
| | 600 g | 2.17 | 4.35 |
| | 700 g | 0.91 | 1.82 |
| max | | 2.17 | 4.35 |

Measurement position No. 2

| Weight of product | | Accumulated power generation amount (mJ) | |
|---|---|---|---|
| | | 200 g | 400 g |
| Total weight (weight of product + weight) | 200 g | 4.05 | — |
| | 300 g | 3.53 | — |
| | 400 g | 3.50 | 7.00 |
| | 500 g | 1.39 | 2.78 |
| | 600 g | 1.02 | 2.05 |
| | 700 g | 0.92 | 1.85 |
| max | | 4.05 | 7.00 |

Measurement position No. 3

| Weight of product | | Accumulated power generation amount (mJ) | |
|---|---|---|---|
| | | 200 g | 400 g |
| Total weight (weight of product + weight) | 200 g | 1.82 | — |
| | 300 g | 3.24 | — |
| | 400 g | 5.28 | 10.63 |
| | 500 g | 6.09 | 12.24 |
| | 600 g | 5.16 | 10.38 |
| | 700 g | 4.46 | 8.97 |
| max | | 6.09 | 12.24 |

Measurement position No. 4

| Weight of product | | Accumulated power generation amount (mJ) | |
|---|---|---|---|
| | | 200 g | 400 g |
| Total weight (weight of product + weight) | 200 g | 2.51 | — |
| | 300 g | 7.26 | — |
| | 400 g | 0.24 | 0.48 |
| | 500 g | 1.52 | 3.06 |
| | 600 g | 8.10 | 16.30 |
| | 700 g | 0.20 | 0.40 |
| max | | 8.10 | 16.30 |

Measurement position No. 5

| Weight of product | | Accumulated power generation amount (mJ) | |
|---|---|---|---|
| | | 200 g | 400 g |
| Total weight (weight of product + weight) | 200 g | 0.22 | — |
| | 300 g | 1.49 | — |
| | 400 g | 25.14 | 50.57 |
| | 500 g | 0.45 | 0.91 |
| | 600 g | 0.17 | 0.34 |
| | 700 g | 0.10 | 0.19 |
| max | | 25.14 | 50.57 |

As shown in table 3, the power generation amounts of the power generator 100 at the measuring positions No. 1 to No. 5 are different from each other. Namely, the power generation amount of the power generator 100 varies depending on the install position of the power generator 100 on the air-conditioning duct.

At the measurement position No. 2, it can be observed that the power generation amounts of both of the power generator having the weight of 200 g and the power generator having the weight of 400 g tend to decrease when the weight is additionally attached. At this measurement position, by fixedly attaching only the power generator having the weight of 400 g to the air-conditioning duct (without additionally attaching the weight to the power generator), it is possible to provide the highest power generation amount.

At the measurement position No. 4, the power generator having the total weight of 300 g (the power generator having the weight of 200 g to which the weight of 100 g is additionally attached) can provide the power generation amount (7.26 mJ) higher than that of only the power generator having the weight of 400 g. Thus, at this measurement position, from the view point of reducing the weight of the power generator, by additionally attaching the weight of 100 g to the power generator having the weight of 200 g, it is possible to provide the higher power generation amount than that of only the power generator having the weight of 400 g. On the other hand, from the view point of providing a higher power generation amount, by additionally attaching the weight of 200 g to the power generator having the weight of 400 g, it is possible to provide the maximum power generation amount (16.30 mJ) as shown in table 3.

As described above, by additionally attaching the weight to the power generator 100, it is possible to adjust the power generation amount of the power generator 100. This makes it possible to maximize the power generation amount of the power generator 100 with keeping the weight of the power generator 100 to be minimal necessary.

The weight described above may not be additionally attached to the power generator 100 and may be directly attached (fixed) to the air-conditioning duct (the rectangular-shaped duct 200) in the vicinity of the power generator 100. Even in the case where the weight is directly fixed to the air-conditioning duct, it is also possible to maximize the power generation amount of the power generator 100 as is the case of directly attaching the weight to the power generator 100.

In this case, it is preferable that the same permanent magnet as the permanent magnet 31 or the permanent magnet 911 is used as the weight. In the case where the weight is constituted of the permanent magnet, it is possible to easily attach (fix) the weight to the air-conditioning duct and easily adjust an install position of the weight, thereby quickly adjusting the power generation amount of the power generator 100.

Further, in a state that each of the power generator 100 and the weight is fixedly attached to the air-conditioning duct, a distance between the power generator 100 and the weight is preferably in the range of about 1 to 150 mm, and more preferably in the range of 10 to 100 mm. If the distance between the power generator 100 and the weight is in the above range, it is possible to reliably provide the same effect as the case of directly attaching the weight to the power generator 100.

Examples of a constituent material for such a weight include a variety of metallic materials having a high specific weight such as lead and tungsten, an alloy thereof and a composite material constituted of a resin material and metallic particles made of any one of these metallic materials.

In this regard, a power generator set (the power generator set of the present invention) for adjusting the power generation amount of the power generator 100 fixedly attached to the air-conditioning duct (the rectangular-shaped duct) is constituted of the power generator 100 and the weight described above.

Further, in the case of using the power generator 100 having the weight of 400 g, attraction force of the attachment 9 with respect to the plate 201 (a sum of attraction force of the magnet assemblies 91 with respect to the plate 201) is preferably set to be larger than the weight of the power generator 100, specifically, preferably set to be equal to or more than 600 g. This makes it possible to stably attach the power generator 100 to any position on the plate 201 used as the top plate of the air-conditioning duct.

In the case of considering a vibrational acceleration of the power generator 100 (assuming that the vibrational acceleration is 1 G) and an external vibration (assuming that a vibrational acceleration of the external vibration is 1 G) caused by an earthquake or the like in addition to a gravitational acceleration 1 G, an acceleration of 3 G is added to the power generator 100 in total. Thus, if the weight of the power generator 100 is 400 g, the attraction force of the attachment 9 with respect to the plate 201 is preferably set to be equal to or more than 1200 g. By setting the attraction force of the attachment 9 with respect to the plate 201 to be equal to or more than 1200 g, it is possible to stably fix the power generator 100 to one of the plates 201 used as the side wall of the rectangular-shaped duct 200 as shown in FIG. 12(b). Further, if the attraction force of the attachment 9 with respect to the plate 201 is set to be about 1200 g, an operator can easily perform the process for removing the power generator 100 from the rectangular-shaped duct 200.

It is possible to adjust the attraction force of the attachment 9 with respect to the plate 201 by appropriately selecting the type (the constituent material) and/or the number of the permanent magnets 911, the constituent material of the yoke 912 and/or the like.

On the other hand, the round-shaped duct 300 shown in FIG. 14 can be obtained by bending a plate material formed of a magnetic material (a steel plate or a plated steel plate) into a cylindrical shape and then bonding (welding) edges of the plate material. Namely, the round-shaped duct 300 has a curved portion (curved surface) forming a circumferential portion of the round-shaped duct 300. Such a round-shaped duct 300 is also used as a flow channel of a device for delivering (emitting, ventilating, inspiring or circulating) gas such as steam and air.

In this embodiment, the magnet assemblies 91 are mounted to the main unit 1 through the first sheet member 92 having the flexibility. Thus, it is possible to fixedly attach the power generator 100 to a vibrating body having a curved surface (curved portion) such as a round-shaped duct 300 shown in FIG. 14.

Further, as described above, the first sheet member 92 in this embodiment has two types of the arm portions 922a, 922b each having different lengths. Thus, it is possible to stably and fixedly attach the power generator 100 to various round-shaped ducts 300 having various curvature radii in a cross-sectional view.

In this regard, the natural frequency in the case of attaching the power generator 11 to the round-shaped duct 300 is also simulated. As a result, the same result as the case of using the rectangular-shaped duct shown in table 1 was obtained. Namely, even in the case of attaching the power generator 100 to the round-shaped duct 300, it is possible to provide the same function and effect as the case of attaching the power generator 100 to the rectangular-shaped duct 200.

Second Embodiment

Next, description will be given to a second embodiment of the power generator of the present invention.

Figure 15:
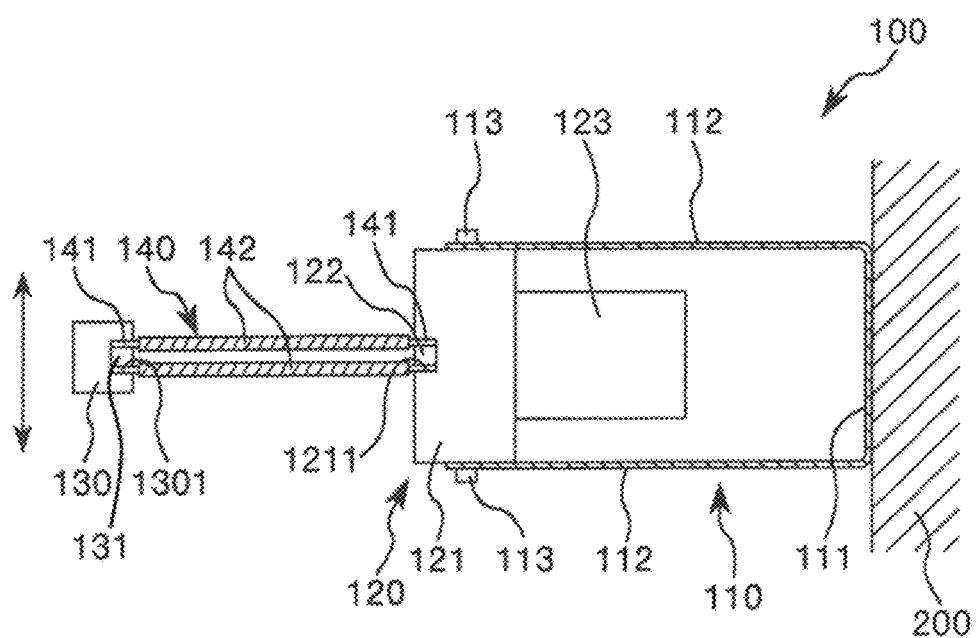
FIG. 15 is a side view showing a basic state of a second embodiment of the power generator of the present invention.
Figure 16:
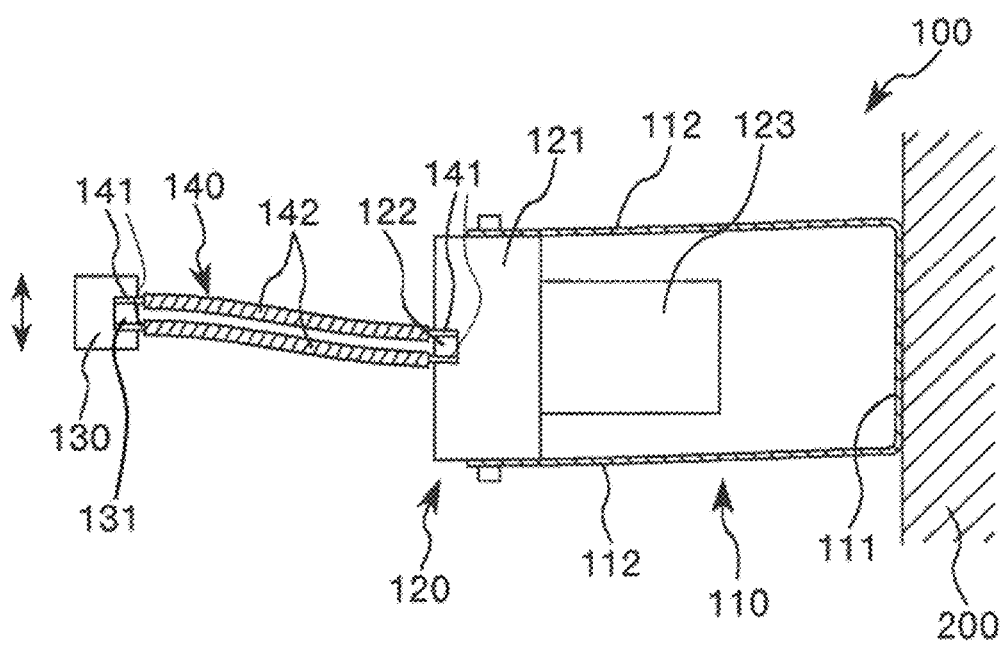
FIG. 16 is a side view showing a vibrating state of the power generator shown in FIG. 15.

FIG. 15 is a side view showing a basic state of the second embodiment of the power generator of the present invention. FIG. 16 is a side view showing a vibrating state of the power generator shown in FIG. 15. Hereinafter, an upper side in each of FIGS. 15 and 16 is referred to as "upper" or "upper side" and a lower side in each of FIGS. 15 and 16 is referred to as "lower" or "lower side". Further, a left side of each of FIGS. 15 and 16 is referred to as "distal side" and a right side of each of FIGS. 15 and 16 is referred to as "proximal side".

Hereinafter, the power generator of the second embodiment will be described by placing emphasis on the points differing from the power generator of the first embodiment, with the same matters being omitted from description.

As shown in FIG. 15, a power generator 100 of the second embodiment includes a frame 110 to be fixed to the air-conditioning duct, a first mass portion 120 fixed to the frame 110 on the distal side of the frame 110, a second mass portion 130 provided to the first mass portion 130 on the distal side of the first mass portion 120 and a pair of magnetostrictive elements 140 arranged in parallel with each other and coupling the first mass portion 120 with the second mass portion 130.

The first mass portion 120 has a permanent magnet 122 provided between the pair of magnetostrictive elements 140, 140. The second mass portion 130 has a permanent magnet 131 provided between the pair of magnetostrictive elements 140, 140. The power generator 100 having such a configuration is configured so that lines of magnetic force generated from each permanent magnet 122, 131 pass through the pair of magnetostrictive elements 140, 140 and a magnetic field loop is formed by the permanent magnets 122, 131 and the magnetostrictive elements 140, 140.

The frame 110 is a portion used for fixedly attaching the power generator 100 to the air-conditioning duct. Such a frame 110 can be obtained by bending a plate material formed of a metallic material such as iron and a stainless steel into a U-shape. The frame 110 includes a bottom plate portion 111 to be fixed to the air-conditioning duct and a pair of lateral plate portions 112 extending from both vertical ends of the bottom plate portion 111. In this embodiment, the first spring portion is constituted of the pair of lateral plate portions 112 and the first vibration system is constituted of these lateral plate portions 112 and the first mass portion 120.

The frame 110 may be obtained by preparing the bottom plate portion 111 and the pair of lateral plate portions 112 as different parts and coupling these parts with a welding method or the like. As a fixing method of fixing the bottom plate portion 111 to the air-conditioning duct, it is possible to employ a screw-locking method, a bonding method with an adhesive agent, a caulking method, a diffusion joining method, a press fitting method with a pin, a brazing method, a welding method (a laser welding method or an electric welding method) or the like.

As shown in FIG. 15, the first mass portion 120 is fixed (held) between the pair of lateral plate portions 112 on the distal side of the lateral plate portions 112 with a press fitting method using a pin 113.

The first mass portion 120 has a coupling portion 121 coupling the pair of magnetostrictive elements 140 on the distal side of the coupling portion 121 and a weight 123 fixed to the coupling portion 121 on the proximal side of the coupling portion 121. The coupling portion 121 has a substantially-rectangular parallelepiped shape and a concave portion 1211 is formed on a substantially central portion in a height direction (the vertical direction in FIG. 15) of the coupling portion 121 on the distal side of the coupling portion 121. Proximal end portions of the magnetostrictive elements 140 are inserted into the concave portion 1211 in a state the permanent magnet 122 is held between the magnetostrictive elements 140. The permanent magnet 122 is fixed to the magnetostrictive elements 140 with an adhesive agent or the like. In the same manner, the magnetostrictive elements 140 are fixed to the concave portion 1211 with an adhesive agent or the like.

As a constituent material for such a coupling portion 121, it is preferable to use a material which can prevent the magnetic field loop formed by the magnetostrictive elements 140, 140 and the permanent magnets 122, 131 from being short-circuited by the coupling portion 121. Thus, it is preferable that the coupling portion 121 is formed of a feebly-magnetic material or a non-magnetic material. From the view point of more reliably preventing the magnetic field loop from being short-circuited, it is more preferable that the coupling portion 121 is formed of the non-magnetic material.

The weight 123 has a cylindrical shape. The weight 123 is used for adjusting a mass of the whole of the first mass portion 120. As a constituent material for such a weight 123, it is possible to use the same constituent material as that of the weight in the first embodiment. For example, it is possible to use a variety of metallic materials having a high specific weight such as lead and tungsten, an alloy thereof and a composite material constituted of a resin material and metallic particles made of any one of these metallic materials as the constituent material for weight 123.

The pair of magnetostrictive elements 140 are coupled with the first mass portion 120 (the coupling portion 121) on the distal side of the first mass portion 120.

Each of the magnetostrictive elements 140 includes a magnetostrictive rod 141 having a longitudinal plate-like shape and a coil 142 wound around an outer periphery of the magnetostrictive rod 141. The magnetostrictive rod 141 is formed of a magnetostrictive material and arranged so that the lines of magnetic force pass through the magnetostrictive rod 141 in an axial direction thereof. Further, the magnetostrictive rod 141 is arranged between the first mass portion 120 and the second mass portion 130 so that a direction in which magnetization is easily generated (an easy magnetization direction) coincides with the axial direction thereof.

The magnetostrictive rod 141 is provided so that the magnetostrictive rod 141 can be relatively displaced in a direction substantially perpendicular to the axial direction thereof (the vertical direction in FIG. 15) in a state that a proximal end portion of the magnetostrictive rod 141 on the side of the first mass portion 120 serves as a fixed end portion and a distal end portion of the magnetostrictive rod 141 on the side of the second mass portion 130 serves as a movable end portion. Namely, in this embodiment, the second spring portion is constituted of each magnetostrictive rod (magnetostrictive member) 141 and the second vibration system is constituted of each magnetostrictive rod 141 and the second mass portion 130. When the second mass portion 130 is relatively displaced relative to the first mass portion 120, the magnetostrictive rods 141 are deformed no as to be expanded and contracted. At this time, magnetic permeability of each magnetostrictive rod 141 varies due to an inverse magnetostrictive effect. This variation of the magnetic permeability of each magnetostrictive rod 141 leads to variation of density of the lines of magnetic force passing through the magnetostrictive rods 141 (density of the lines of magnetic force passing through the coils 142), thereby generating a voltage in the coils 142.

A thickness cross-sectional area) of the magnetostrictive rod 141 is substantially constant along the axial direction of thereof. An average thickness of the magnetostrictive rod 141 is not particularly limited to a specific value, but is preferably in the range of about 0.3 to 10 mm, and more preferably in the range of about 0.5 to 5 mm. Further, an average value of the cross-sectional area of the magnetostrictive rod 141 is preferably in the range of about 0.2 to 200 mm$^2$, and more preferably in the range of about 0.5 to 50 mm$^2$. With such a configuration, it is possible to reliably pass the lines of magnetic force through the magnetostrictive rod 141 in the axial direction thereof.

A Young's modulus of the magnetostrictive material for the magnetostrictive rod 141 is preferably in the range of about 30 to 100 GPa, more preferably in the range of about 50 to 90 GPa, and even more preferably in the range of about 60 to 80 GPa. By forming the magnetostrictive rod 141 with the magnetostrictive material having the above Young's modulus, it is possible to expand and contract the magnetostrictive rod 2 more drastically. Since this allows the magnetic permeability of the magnetostrictive rod 141 to vary more drastically, it is possible to more improve the power generation efficiency of the power generator 100.

The magnetostrictive material having the above Young's modulus is not particularly limited to a specific kind. Examples of such a magnetostrictive material include an iron-gallium based alloy, an iron-cobalt based alloy, an iron-nickel based alloy and a combination of two or more of these materials. Among them, a magnetostrictive material containing an iron-gallium based alloy (having a Young's modulus of about 70 GPa) as a main component thereof is preferably used. A Young's modulus of the magnetostrictive material containing the iron-gallium based alloy as the main component thereof can be easily adjusted to fall within the above range.

Further, it is preferred that the magnetostrictive material described above contains at least one of rare-earth metal such as Y, Pr, Sm, Tb, Dy, Ho, Er and Tm. By using the magnetostrictive material containing at least one rare-earth metal mentioned above, it is possible to make the variation of the magnetic permeability of each of the magnetostrictive rod 141 larger.

The coils 142 are respectively wound (provided) around the outer peripheries of the magnetostrictive rods 141 so as to surround a part of each magnetostrictive rod 141 except for both end portions (coupling portions to which the first mass portion 120 and the second mass portion 130 are respectively coupled) of each magnetostrictive rod 141.

Each of the coils 142 is formed by winding a wire around the outer periphery of each magnetostrictive rod 141. With such a configuration, the coils 142 are provided so that the lines of magnetic force passing through the magnetostrictive rods 141 pass inside the coils 142 (inner cavities of the coils 142) in an axial direction of the coils 142 (in this embodiment, the axial direction of the coils 142 is equivalent to the axial direction of the magnetostrictive rods 141). Due to the variation of the magnetic permeability of the magnetostrictive rods 141, that is, due to the variation of the density of the lines of magnetic force (magnetic flux density) passing through the magnetostrictive rods 141, the voltage is generated in the coils 142.

The wire is not particularly limited to a specific type. Examples of the wire include a wire obtained by covering a copper base line with an insulating layer, a wire obtained by covering a copper base line with an insulating layer to which an adhesive (fusion) function is imparted and a combination of two or more of these wires.

A winding number of the wire is not particularly limited to a specific value, but is preferably in the range of about 100 to 500, and more preferably in the range of about 150 to 450. With such a configuration, it is possible to more increase the voltage generated in the coils 142.

Further, a cross-sectional area of the wire is not particularly limited to a specific value, but is preferably in the range of about $5\times10^{-4}$ to 0.126 mm$^2$, and more preferably in the range of about $2\times10^{-3}$ to 0.03 mm$^2$. Since the wire with such a wire diameter in the above range has a sufficiently small resistance value, it is possible to efficiently output the electric current flowing in the coil 142 to the outside with the generated voltage. As a result, it is possible to improve the power generation efficiency of the power generator 100.

A cross-sectional shape of the wire may be any shape. Examples of the cross-sectional shape of the wire include a polygonal shape such as a triangular shape, a square shape, a rectangular shape and a hexagonal shape; a circular shape and an elliptical shape.

The second mass portion 130 is fixed to the magnetostrictive elements 140, 140 on the distal side of the magnetostrictive elements 140, 140. The second mass portion 130 serves as a weight for applying external force or vibration in the vertical direction to the magnetostrictive elements 140. Due to the vibration of the air-conditioning duct, the external force or the vibration in the vertical direction is applied to the second mass portion 130. This allows the distal end portions of the magnetostrictive elements 140 to be displaced (vibrated) relative to the proximal end portions of the magnetostrictive elements 140.

The second mass portion 130 has a substantially-rectangular parallelepiped shape and a concave portion 1301 is formed on a substantially central portion in a height direction (the vertical direction in FIG. 15) of the second mass portion 130 on the proximal side of the second mass portion 130. The distal end portions of the magnetostrictive rods 141 are inserted into the concave portion 1301 in a state the permanent magnet 131 is held between the magnetostrictive rods 141. The permanent magnet 131 is fixed to the magnetostrictive rods 141 with an adhesive agent or the like. In the same manner, the magnetostrictive rods 141 are fixed to the concave portion 1301 with an adhesive agent or the like.

As a constituent material for the second mass portion 130, it is preferable to use a material which can prevent the magnetic field loop formed by the magnetostrictive rods 141 and the permanent magnets 122, 131 from being short-circuited by the second mass portion 130 in the same manner as the above-mentioned coupling portion 121. Thus, it is preferable that the second mass portion 130 is formed of a feebly-magnetic material or a non-magnetic material, and it is more preferable that the second mass portion 130 is formed of the non-magnetic material.

As shown in FIG. 15, the permanent magnet 122 provided between the proximal end portions of the magnetostrictive rods 141 is arranged in a state that its south pole faces toward the upper side in FIG. 15 and its north pole faces toward the lower side in FIG. 15. On the other hand, the permanent magnet 131 provided between the distal end portions of the magnetostrictive rods 141 is arranged so that its south pole faces toward the lower side in FIG. 15 and its north pole faces toward the upper side. Namely, each permanent magnet 122, 131 is arranged so that a magnetization direction thereof is perpendicular to an arrangement direction of the magnetostrictive rods 141 (the magnetostrictive elements 140). With this configuration, the magnetic field loop in a clockwise direction is formed in the power generating unit 10 (the power generator 100).

As a constituent material for the permanent magnets 122, 131, it is possible to use the same constituent material as that of the above-mentioned permanent magnet 31.

In the power generator 100 having such a configuration, the power generating unit 10 includes the first vibration system constituted of the pair of lateral plate portions 112 and the first mass portion 120 and the second vibration system constituted of the pair of magnetostrictive rods 141 and the second mass portion 130. Further, in the power generator 100, the supporting member is constituted of the bottom plate portion 111 of the frame 110.

As shown in FIG. 16, the power generator 100 described above is used in a state that the bottom plate portion 111 of the frame 110 is fixed to the air-conditioning duct (rectangular parallelepiped duct 200). When the vibration of the air-conditioning duct is transmitted to the frame 110 in this state, this vibration is transmitted to the first mass portion 120 through the pair of lateral plate portions 112. As a result, the first mass portion 120 is vibrated relative to the bottom plate portion 111 (the supporting member) in the vertical direction. Further, when the vibration transmitted from the air-conditioning duct to the first mass portion 120 is further transmitted to the second mass portion 130 through the magnetostrictive rods 141, 141, the second mass portion 130 is vibrated relative to the first mass portion 120 in the vertical direction. At the time when the second mass portion 130 is vibrated in the vertical direction, each magnetostrictive rod 141 is deformed so as to be expanded and contracted, thereby varying the density of the lines of magnetic force passing through each magnetostrictive rod 141 (the density of the lines of magnetic force passing through the inner cavities of the coils 142 in the axial direction thereof). Due to this variation of the density of the lines of magnetic force, the voltage is generated in the coils 142.

The power generator 100 having such a configuration includes the first vibration system in which the first mass portion 120 is vibrated relative to the bottom plate portion 111 through the pair of lateral plate portions 112 (first spring portion) and the second vibration system in which the second mass portion 130 is vibrated relative to the first mass portion 120 through the pair of magnetostrictive rods 141, 141 (second spring portion). Namely, the power generator 100 of this embodiment also constitutes the two-degree-freedom vibration system as is the case with the power generator 100 of the first embodiment described above.

Even in the power generator 100 of this embodiment, each of the first natural frequency $\omega_1$ of the first vibration system and the second natural frequency $\omega_2$ of the second vibration system is set to be in the range of 14 to 42 Hz by adjusting a first mass $m_1$ [kg] of the first mass portion 120, a first spring constant $k_1$ [N/m] of the pair of lateral plate portions 112 (the first spring portion), a second mass $m_2$ [kg] of the second mass portion 130 and a second spring constant $k_2$ [N/m] of the magnetostrictive rods 141, 141 (the second spring portion) as is the case with the power generator 100 of the first embodiment described above. This allows the power generating unit 10 (the power generator 100) to efficiently utilize the vibration of the air-conditioning duct to generate the electric power with high power generation efficiency.

Further, by setting the damping coefficients $C_2$ and the three parameters ($\Omega_1$, $\Omega_2$ and $\mu$) determining the two resonance frequencies $f_1$ and $f_2$ of the power generator 100 in the same manner as the power generator 100 of the first embodiment, it is possible to provide the same effect as the power generator 100 of the first embodiment described above.

In the power generator 100 of this embodiment, values of the damping coefficients $C_2$ respectively corresponding to the natural frequencies $\omega_1$ and $\omega_2$ can be adjusted by a counter electromotive force coefficient determined by the winding number of the coils 142 and density of a magnetic flux of the bias lines of magnetic field generated from the permanent magnets 122, 131 and passing through inside the coils 142; and internal impedance and inductance determined by the winding number of the coils 142 and the diameter of the wire used for forming the coils 142. Namely, the values of the damping coefficients $C_2$ can be adjusted by changing the winding number of the coils 142 and the diameter of the wire for forming the coils 142.

In this regard, although description has been given to the case where the power generator 100 of this embodiment takes the configuration in which the permanent magnets 122, 131 are respectively provided on the both sides of the first mass portion 120 and the second mass portion 130, the power generator 100 may take a configuration in which one of these permanent magnets is replaced with a component formed of a magnetic material.

Further, in the power generator 100 of this embodiment described above, the configuration of the power generating unit is not particularly limited to the configuration shown in FIG. 15. For example, it may take a configuration in which a yoke for coupling the first mass portion 120 with the second mass portion 130 through the permanent magnets on the rear side of the paper of FIG. 15 is provided in parallel with the magnetostrictive elements 140. In this case, each of the first mass portion 120 and the second mass portion 130 is formed of the same magnetic material as the above-mentioned yoke 33 and the permanent magnets 122, 131 are arranged so that the magnetization directions thereof are directed from the front side toward the rear side (or from the rear side toward the front side) of the paper of FIG. 15. This makes it possible to provide the power generating unit in which the magnetic field loop is formed so as to flow in the two magnetostrictive elements 140, 140 in one direction. In such a configuration, it may be possible to provide the coil 142 wound around an outer periphery of the yoke instead of winding (providing) the coils 142 around the magnetostrictive rods 141.

The power generator 100 of the second embodiment having such a configuration can provide the same function and effect as the power generator 100 of the first embodiment.

Third Embodiment

Next, description will be given to a third embodiment of the power generator of the present invention.

Figure 17:
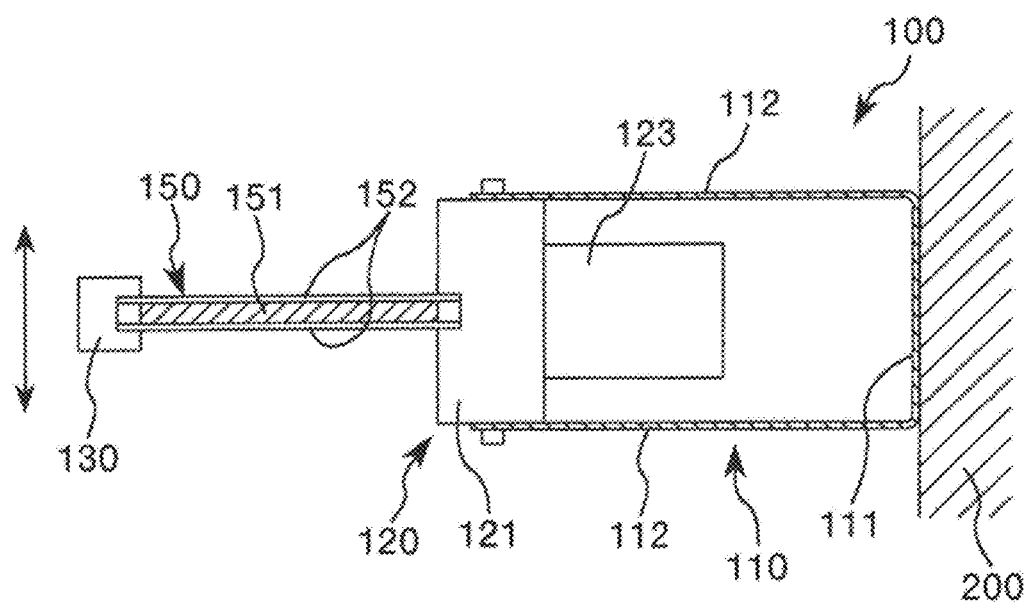
FIG. 17 is a side view showing a basic state of a third embodiment of the power generator of the present invention.
Figure 18:
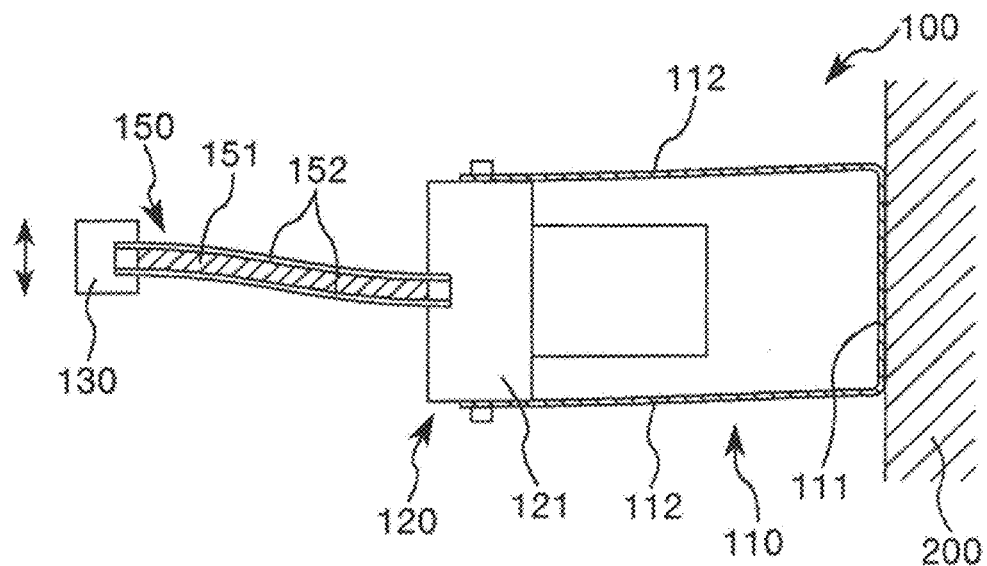
FIG. 18 is a side view showing a vibrating state of power generator shown in FIG. 17.

FIG. 17 is a side view showing a basic state of the third embodiment of the power generator of the present invention. FIG. 18 is a side view showing a vibrating state of the power generator shown in FIG. 17. Hereinafter, an upper side in each of FIGS. 17 and 18 is referred to as "upper" or "upper side" and a lower side in each of FIGS. 17 and 18 is referred to as "lower" or "lower side". Further, a left side of each of FIGS. 17 and 18 is referred to as "distal side" and a right side of each of FIGS. 17 and 18 is referred to as "proximal side".

Hereinafter, the power generator of the third embodiment will be described by placing emphasis on the points differing from the power generators of the first embodiment and the second embodiment, with the same matters being omitted from description.

A power generator 100 of the third embodiment has the same configuration as the power generator 100 of the second embodiment except that the configuration of the second spring portion is modified. Namely, in this embodiment, the second spring portion is constituted of one piezoelectric element 150.

As shown in FIG. 17, the piezoelectric element 150 includes a piezoelectric body layer (piezoelectric member) 151 which can be elastically deformed and a pair of electrodes 152 provided so as to face each other through the piezoelectric body layer 151.

The piezoelectric body layer 151 is formed of a piezoelectric material and has a belt-like shape (longitudinal plate-like shape). The piezoelectric body layer 151 can be relatively displaced in a direction substantially perpendicular to an axial direction thereof (a vertical direction in FIG. 17) in a state that one end portion (proximal end portion) on the side of the first mass portion 120 serves as a fixed end portion and the other end portion (distal end portion) on the side of the second mass portion 130 serves as a movable end portion. When the piezoelectric body layer 151 is deformed (expanded and contracted), polarization is generated in the vicinities of both surfaces of the piezoelectric body layer 151 due to a piezoelectric effect. As a result, a voltage is generated between the pair of electrodes 152.

Examples of the piezoelectric material for forming the piezoelectric body layer 151 include barium titanate, lead zirconate, lead zirconate titanate, zinc oxide, aluminum nitride, lithium tantalate, lithium niobate and crystal.

Although an average thickness of the piezoelectric body layer 151 is not particularly limited to a specific value, but preferably in the range of about 0.05 to 1 mm, and more preferably in the range of about 0.1 to 0.3 mm. By using the piezoelectric body layer 151 having the above average thickness, it is possible to suppress material costs of the piezoelectric body layer 151 with keeping durability of the piezoelectric body layer 151.

As a constituent material for forming each electrode 152, it is possible to use a variety of metallic materials such as Fe, Ni, Co, Zn, Pt, Au, Ag, Cu, Pd, Al, W, Ti and Mo or an alloy containing one or more of these metallic materials.

Although an average thickness of the electrode 152 is not particularly limited to a specific value, but preferably in the range of about 0.1 to 100 μm, and more preferably in the range of about 1 to 10 μm. By using the electrode 152 having the above average thickness, it is possible to improve durability of the electrode 152 and prevent the electrode 152 from releasing (removing) from the piezoelectric body layer 151 for a long period.

As shown in FIG. 18, when the vibration of the air-conditioning duct is transmitted to the frame 110 of the power generator 100, this vibration is transmitted to the first mass portion 120 through the pair of lateral plate portions 112 and the first mass portion 120 is vibrated relative to the bottom plate portion 111 (the supporting member) in the vertical direction. Further, the vibration transmitted from the air-conditioning duct to the first mass portion 120 is transmitted to the second mass portion 130 through the piezoelectric body layer 151 and the second mass portion 130 is vibrated relative to the first mass portion 120 in the vertical direction. At the time when the second mass portion 130 is vibrated in the vertical direction, the piezoelectric body layer 151 is deformed. As a result, the polarization is generated in the vicinities of the both surfaces of the piezoelectric body layer 151 due to the piezoelectric effect and the voltage is generated between the electrodes 152.

The above-mentioned power generator 100 of this embodiment also constitutes the two-degree-freedom vibration system as is the case with the power generator 100 of the second embodiment. The power generator 100 of this embodiment can also provide the same function and effect as the power generators 100 of the first embodiment and the second embodiment.

In the power generator 100 of this embodiment, the damping coefficients $C_2$ respectively corresponding to the natural frequencies $\omega_1$ and $\omega_2$ can be adjusted by changing a thickness and a width of the piezoelectric body layer 151 and a piezoelectric constant which the piezoelectric body layer 151 itself has.

Fourth Embodiment

Next, description will be given to a fourth embodiment of the power generator of the present invention.

Figure 19:
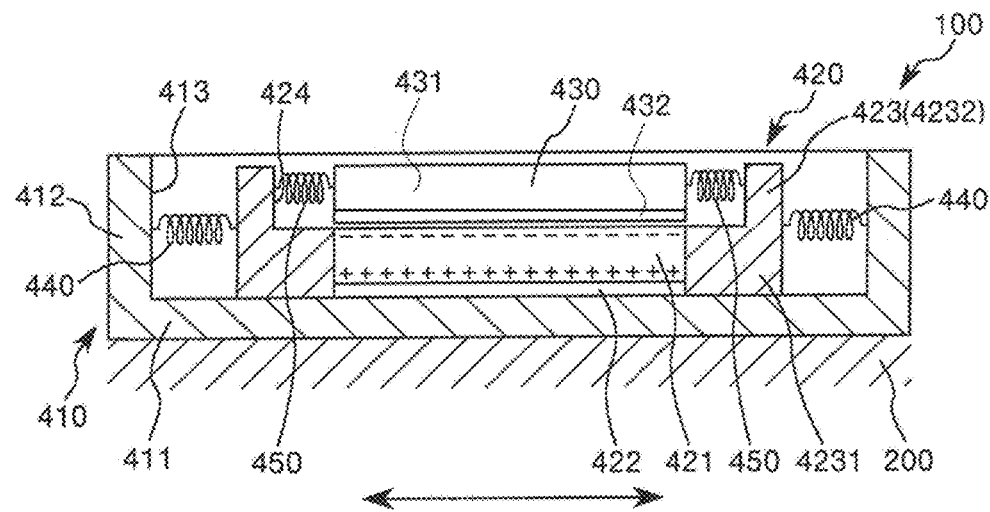
FIG. 19 is a horizontal cross-sectional view showing a fourth embodiment of the power generator of the present invention.
Figure 20:
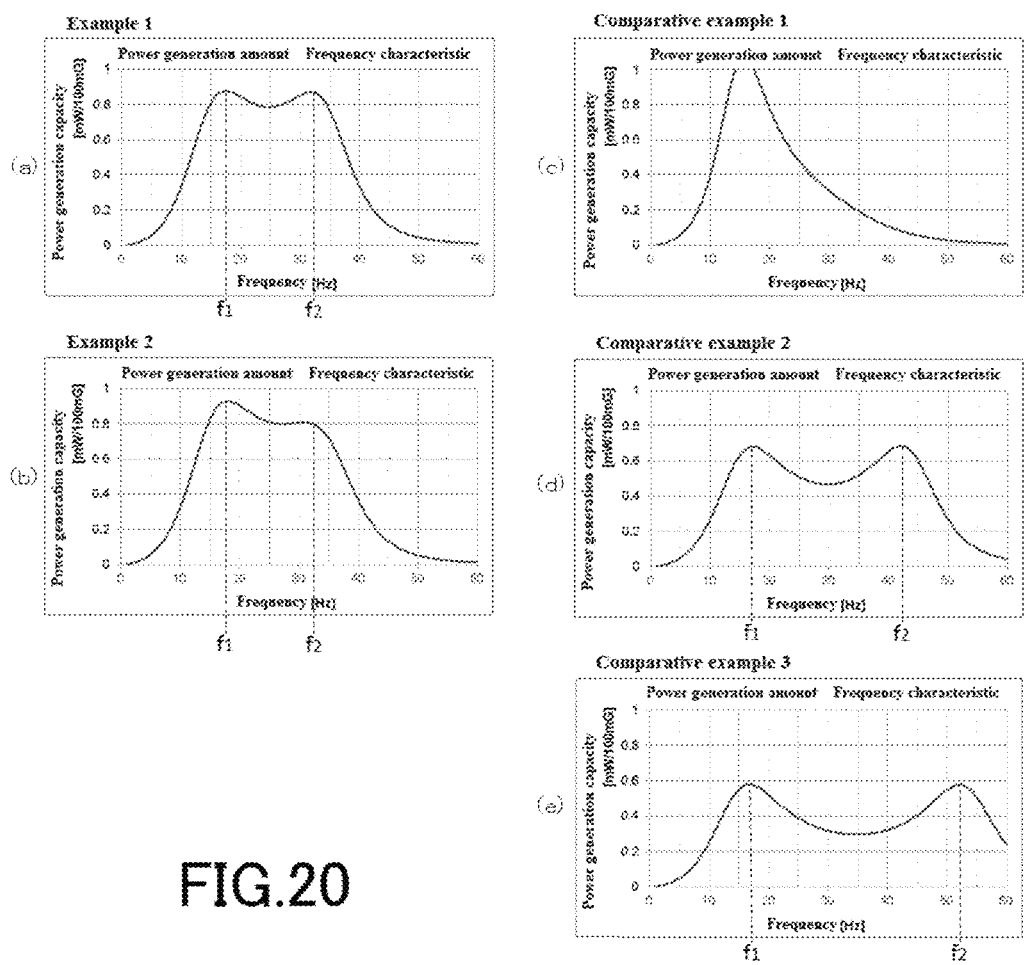
FIGS. 20(a) to 20(e) are graphs showing frequency characteristics of power generation amounts of power generators of examples and comparative examples.

FIG. 19 is a horizontal cross-sectional view showing the fourth embodiment of the power generator of the present invention. Hereinafter, an upper side in FIG. 19 is referred to as "upper" or "upper side" and a lower side in FIG. 19 is referred to as "lower" or "lower side".

Hereinafter, the power generator of the fourth embodiment will be described by placing emphasis on the points differing from the power generators of the first embodiment to the third embodiment, with the same matters being omitted from description.

As shown in FIG. 19, a power generator 100 of the fourth embodiment includes a housing (supporting member) 410 to be fixed to the air-conditioning duct and a power generating unit 10 supported in the housing 410 so that the power generating unit 10 can be vibrated in a horizontal direction in FIG. 19. The power generating unit 10 includes an electret assembly (first mass portion) 420 having an electret layer 421, an electrode (second mass portion) 430 provided in the housing 410 on the opposite side of the housing 410 opposed to the side on which the electret assembly 420 is provided, a pair of first spring portions 440 (two first spring portions 440) for coupling the electret assembly 420 with the housing 410 and a pair of second spring portions 450 (two second spring portions 450) for coupling the electrode 430 with the electret assembly 420.

The pair of first spring portions 440 couples the electret assembly 420 with the housing 410 in the housing 410 so that the electret assembly 420 can be vibrated in the horizontal direction in FIG. 19. The pair of second spring portions 450 couples the electrode 430 with the electret assembly 420 above the electret assembly 420 so that the electrode 430 can be vibrated in the vertical direction in FIG. 19.

The housing 410 has a rectangular shape in a planar view. The housing 410 includes a bottom plate portion 411 to be fixed to the air-conditioning duct and lateral plate portions 412 extending from the bottom plate portion 411 toward the vertical upper direction so as to surround an edge of the bottom plate portion 411. Further, the power generating unit 10 is contained (received) in a concave portion (space) 413 defined by the bottom plate portion 411 and the lateral plate portions 412.

As a constituent material for forming the housing 410, it is possible to use a metallic material, a ceramic material, a resin material, a combination of two or more of the above materials and the like. Particularly, it is preferable that the housing 410 is configured so that the electret assembly 420 can be vibrated on the bottom plate portion 411 with low friction (or with no friction). From this view point, the metallic material and the ceramic material are more preferable used as the constituent material for forming the housing 410.

In the housing 410 (the concave portion 413), the electret assembly (the first mass portion) 420 is supported by the pair of first spring portions 440 so that the electret assembly (the first mass portion) 420 can be vibrated in the horizontal direction in FIG. 19.

Each first spring portion 440 is constituted of a coil spring. One end portion of the coil spring is fixed to the lateral plate portion 412 of the housing 410 and the other end portion of the coil spring is fixed to the electret assembly 420.

As shown in FIG. 19, the electret assembly 420 includes an electrode 422, the electret layer 421 laminated (provided) on the electrode 422 and an electret holding portion 423 for holding the electrode 422 and the electret layer 421 at a central portion of the housing 410.

The electret layer 421 is formed of a material which can semi-permanently hold a large amount of electric charges in the vicinity of its surfaces.

As a constituent material for forming such an electret layer 421, it is possible to use a variety of dielectric materials. Examples of the dielectric material include a fluorine resin such as polytetrafluoroethylene and polyvinylidene fluoride and a variety of ferroelectric materials having a perovskite structure, a bismuth layer structure or a tungsten bronze structure as a crystal structure thereof, An average thickness of the electret layer 421 is not particularly limited to a specific value, but preferably in the range of about 1 to 100 µm, and more preferably in the range of about 10 to 50 µm. By using the electret layer 421 having the above average thickness, it is possible to suppress material costs of the electret layer 421 with keeping durability and electric charge holding capacity of the electret layer 421.

The electrode 422 is formed of the same metallic material as one of the variety of metallic materials for the above-mentioned electrode 152. An average thickness of the electrode 422 is not particularly limited to a specific value, but preferably in the range of about 0.1 to 100 µm, and more preferably in the range of about 1 to 100 µm. By using the electrode 422 having the above average thickness, it is possible to improve durability of the electrode 422.

A shape of the electret holding portion 423 in a planar view is a rectangular shape. The electret holding portion 423 include a bottom portion 4231 and lateral portions 4232 extending from the bottom portion 4231 toward the vertical upper direction along an edge of the bottom portion 4231. The electret holding portion 423 can be slidably moved relative to the bottom plate portion 411 of the housing 410 due to the expansion and contraction of the first spring portions 440. A through-hole is formed in a central portion of the bottom portion 4231 so as to pass through the bottom portion 4231 in a thickness direction thereof. The electrode 422 and the electret layer 421 are fixed in this through-hole. Further, the electrode 430 is contained (received) in a concave portion (space) 424 defined by the bottom portion 4231 and the four lateral portions 4232.

In the electret holding portion 423 (the concave portion 424), the electrode (the second mass portion) 430 is supported by the pair of second spring portions 450 so that the electrode (the second mass portion) 430 can be vibrated in the horizontal direction in FIG. 19.

Each second spring portion 450 is constituted of a coil spring. One end portion of the coil spring is fixed to the lateral portion 4232 of the electret holding portion 423. The other end portion of the coil spring is fixed to the electrode 430.

This electrode 430 includes a plate-shaped support board 431 and an electrode layer 432 provided on the support board 431. This electrode layer 432 is configured so that the electrode layer 432 overlaps with the electret layer 421 in a planar view in a natural state.

In the power generator 100, inductive charges are induced in the electrode layer 432 by electrostatic induction caused by a static electric field generated by the electret layer 421 which holds a large amount of electric charges in the vicinity of its surfaces. When the electrode 430 is vibrated relative to the electret assembly 420 in the horizontal direction, an overlapping area between the electrode layer 432 and the electret layer 421 in a planar view varies. As a result, a voltage is generated between the electrode layer 432 and the electrode 422.

The support board 431 is supported by the pair of second spring portions 450 and can be vibrated relative to the electret assembly 420 in the horizontal direction. Although the support hoard 431 is not particularly limited to a specific type, it is possible to use a FPC support board as the support board 431, for example.

The electrode layer 432 is formed of the same metallic material as one of the variety of metallic materials for the above-mentioned electrode 152. An average thickness of the electrode layer 432 is not particularly limited to a specific value, but preferably in the range of about 0.1 to 100 µm, and more preferably in the range of about 1 to 10 µm. By using the electrode layer 432 having the above average thickness, it is possible to improve durability of the electrode layer 432, thereby reliably preventing the electrode layer 432 from releasing (removing) from the support board 431 and cracking of the electrode layer 432.

As shown in FIG. 19, the power generator 100 is used in a state that the bottom plate portion 411 of the housing 410 is fixed to the air-conditioning duct (the rectangular parallelepiped duct 200). In this state, when the vibration of the air-conditioning duct is transmitted to the housing 410, this vibration is further transmitted to the electret assembly 420 through the pair of first spring portions 440. As a result, the electret assembly 420 is vibrated relative to the housing 410 (the supporting member) in the horizontal direction. Further, the vibration transmitted from the air-conditioning duct to the electret assembly 420 is transmitted to the electrode 430 through the pair of second spring portions 450. As a result, the electrode 430 is vibrated relative to the electret assembly 420 in the horizontal direction. At the time when the electrode 430 is vibrated in the horizontal direction, the overlapping area between the electrode 430 (the electrode layer 432) and the electret layer 421 in the planar view varies. As a result, the voltage is generated between the electrode layer 432 and the electrode 422.

The power generator 100 having such a configuration includes the first vibration system in which the electret assembly 420 is vibrated relative to the housing 410 through the pair of first spring portions 440 and the second vibration system in which the electrode 430 is vibrated relative to the electret assembly 420 through the pair of second spring portions 450. Namely, the power generator 100 of this embodiment also constitutes the two-degree-freedom vibration system as is the case with the power generators 100 of the first embodiment to the third embodiment described above, Even in the power generator 100 of this embodiment, each of the first natural frequency $\omega_1$ of the first vibration system and the second natural frequency $\omega_2$ of the second vibration system is set to be in the range of 14 to 42 Hz by adjusting a first mass $m_1$ [kg] of the electret assembly 420, a first spring constant $k_1$ [N/m] of the pair of first spring portions 440, a second mass $m_2$ [kg] of the electrode 430 and a second spring constant $k_2$ [N/m] of the second spring portions 450 as is the case with the power generator 100 of the first embodiment described above. This allows the power generating unit 10 (the power generator 100) to efficiently utilize the vibration of the air-conditioning duct to generate the electric power with high power generation efficiency.

Further, by setting the damping coefficients $C_2$ and the three parameters ($\Omega_1$, $\Omega_2$ and $\mu$) determining the two resonance frequencies $f_1$ and $f_2$ of the power generator 100 in the same manner as the power generator 100 of the first embodiment, it is possible to provide the same effect as the power generator 100 of the first embodiment described above.

In the power generator 100 of this embodiment, the values of the damping coefficients $C_2$ respectively corresponding to the natural frequencies $\omega_1$ and $\omega_2$ can be adjusted by changing a distance (gap) between the electret layer 421 and the electrode layer 432 or a facing area between the electret layer 421 and the electrode layer 432 in the natural state (a vibration-less state). In the case where the electrode 430 is configured so as to have a plurality of electrode regions on the support board 431, it is possible to adjust the values of the damping coefficients $C_2$ by changing the number of the electrode regions.

In the power generator 100, although the lateral plate portions 412 (the lateral plate portions 412 on the front side and the rear side of the paper in FIG. 19) of the housing 410 and the electret assembly 420 may be separated from each other when the electret assembly 420 is vibrated relative to the housing 410, it is preferable that the electret assembly 420 makes contact with these lateral plate portions 412 of the housing 410. In this case, the electret assembly 420 is vibrated with keeping contact with these lateral plate portions 412 of the housing 410. Thus, these lateral plate portions 412 serve as a guide portion for guiding the vibration of the electret assembly 420 in the horizontal direction, thereby preventing the electret assembly 420 from being vibrated in other directions (the front direction or the rear direction of the paper). This makes it possible to more improve vibration efficiency of the electret assembly 420 due to the vibration of the air-conditioning duct. As a result, it is possible to more improve the power generation efficiency of the power generator 100.

Further, although the lateral portions 4232 (the lateral portions 4232 on the front side and the rear side of the paper in FIG. 19) of the electret assembly 420 and the electrode 430 may be separated from each other when the electrode 430 is vibrated relative to the electret assembly 420, it is preferable that the electrode 430 makes contact with these lateral portions 4232 of the electret assembly 420. With this configuration, the electrode 430 is vibrated with keeping contact with these lateral portions 4232 of the electret assembly 420. Thus, in the same manner as the lateral plate portions 412 of the housing 410, these lateral portions 4232 serve as a guide portion for guiding the vibration of the electrode 430 in the horizontal direction, thereby more improving vibration efficiency of the electrode 430 due to the vibration of the air-conditioning duct. As a result, it is possible to more improve the power generation efficiency of the power generator 100.

Although the above description has been given with considering that the shapes of the housing 410 and the electret assembly 420 in the planar view are the rectangular shape, the shapes of the housing 410 and the electret assembly 420 may be any other shape. For example, each of the shapes of the housing 410 and the electret assembly 420 may be a cylindrical shape.

The power generator 100 of the fourth embodiment having such a configuration can provide the same function and effect as the power generators 100 of the first embodiment to the third embodiment.

Although the power generator, the power generator set and the power generation system of the present invention have been described based on the embodiments shown in the accompanying drawings, the present invention is not limited thereto. The configuration of each component may possibly be replaced with other arbitrary configurations having equivalent functions. Further, it is possible to add other optional components to the present invention.

For example, it is possible to combine the configurations according to the first embodiment to the fourth embodiments of the present invention in an appropriate manner.

Although the power generator, the power generator set and the power generation system of the present invention have been described based on to the embodiments shown in the accompanying drawings, the present invention is not limited thereto. The configuration of each component may possibly be replaced with other arbitrary configurations having equivalent functions. Further, it is possible to add other optional components to the present invention.

For example, it is possible to combine the configurations according to the first embodiment to the fourth embodiments of the present invention in an appropriate manner.

EXAMPLES

Next, description will be given to the present invention based on examples of the present invention, but the present invention is not limited thereto.

Examples 1 and 2 and Comparative Examples 1 to 3

For the power generator 100 having the configuration shown in FIGS. 1 to 4, the first mass $m_1$ [kg] of the coil assembly 40, the first spring constant $k_1$ [N/m] of the first spring portion 64, the second mass $m_2$ [kg] of the magnet assembly 30 and the second spring constant $k_2$ [N/m] of the second spring portion 65 were set as shown in the following table 4 to obtain the first natural frequency $\omega_1$ of the first vibration system and the second natural frequency $\omega_2$ of the second vibration system. Further, the damping coefficients C2 respectively corresponding to the natural frequencies $\omega_1$ and $\omega_2$ were set as shown in table 4.

FIGS. 20(a) to 20(e) are graphs showing frequency characteristics of power generation amounts of the power generators of examples 1 and 2 and comparative examples 1 to 3. The power generation amount $A_1$ [mW/100 mG] at the first resonance frequency $f_1$, the power generation amount $A_2$ [mW/100 mG] at the second resonance frequency $f_2$ and the minimum power generation amount $A_3$ [mW/100 mG] in the frequency band between the first resonance frequency $f_1$ and the second resonance frequency $f_2$ shown in each graph are shown in table 4.

TABLE 4

|  |  | Example 1 | Example 2 | Comparative example 1 | Comparative example 2 | Comparative example 3 |
|---|---|---|---|---|---|---|
| $m_1$ | [kg] | 0.133 | 0.133 | 0.0632 | 0.118 | 0.109 |
| $k_1$ | [N/m] | 6720 | 6720 | 3166 | 9100 | 12280 |
| $m_2$ | [kg] | 0.084 | 0.084 | 0.084 | 0.084 | 0.084 |
| $k_2$ | [N/m] | 735 | 735 | 735 | 800 | 800 |
| Parameters determining natural frequencies | | | | | | |
| $\Omega_1$ | [rad/S] | 225 | 225 | 225 | 278 | 336 |
| $\Omega_2$ | [rad/S] | 94 | 94 | 94 | 98 | 98 |
| $\mu$ | | 0.632 | 0.632 | 1.328 | 0.706 | 0.771 |
| Natural frequencies | | | | | | |
| $\omega_1$ | [Hz] | 14 | 14 | 13.25 | 14.5 | 14.5 |
| $\omega_2$ | [Hz] | 38 | 38 | 40.16 | 48 | 58 |
| Damping coefficients | | | | | | |
| $C_2$ (Damping coefficient coresponding to $\omega_1$) | [N/(m/s)] | 8.199 | 8.175 | 8.199 | 8.198 | 8.198 |
| $C_2$ (Damping coeffecient coresponding to $\omega_2$) | [N/(m/s)] | 8.147 | 7.975 | 8.147 | 8.112 | 8.07 |
| Power generation amounts | | | | | | |
| $A_1$ | [mW/100 mG] | 0.89 | 0.92 | 1.1 | 0.69 | 0.58 |
| $A_2$ | [mW/100 mG] | 0.78 | 0.8 | — | 0.48 | 0.3 |
| $A_3$ | [mW/100 mG] | 0.89 | 0.8 | — | 0.69 | 0.58 |

In each of example 1 and example 2, the first natural frequency $\omega_1$ of the first vibration system is 14 Hz and the second natural frequency $\omega_2$ of the second vibration system is 38 Hz. In these examples, it can be observed that a distance between the first resonance frequency $f_1$ and the second resonance frequency $f_2$ is sufficiently large. Further, it can be observed that the power generation amount is kept high over this broad frequency band and the variation in the power generation amount is small over this broad frequency band. Namely, this result indicates that the power generators of example 1 and example 2 can efficiently utilize the vibration of the air-conditioning duct to generate the electric power with high power generation efficiency.

From a comparative result of example 1 and example 2, it can be observed that a graph form which indicates the frequency characteristics changes depending on a difference between the values of the damping coefficients $C_2$ respectively corresponding to the natural frequencies $\omega_1$ and $\omega_2$. Further, it can be observed that the power generator of example 1 has a more superior balance of the frequency characteristics than the power generator of example 2.

On the other hand, in the power generator of comparative example 1, the first natural frequency $\omega_1$ of the first vibration system is less than 14 Hz (equal to 13.25 Hz). Thus, the variation between the power generation amounts at the first resonance frequency $f_1$ and the second resonance frequency $f_2$ becomes too large. Such a power generator cannot efficiently generate the electric power with utilizing the vibration of the air-conditioning duct.

In the power generators of comparative example 2 and comparative example 3, the second natural frequency $\omega_2$ of the second vibration system is 48 Hz or 58 Hz. Although these power generators have a broad sensitivity band, a maximum value of the power generation amount (the power generation amount at each resonance frequency $f_1$ and $f_2$) becomes too low In addition, the variation in the power generation amount is significantly large.

INDUSTRIAL APPLICABILITY

According to the present invention, since the power generator including, the two vibration system is configured so that the natural frequency of each vibration system becomes an appropriate value (in the range of 14 to 42 Hz), the power generator of the present invention can efficiently utilize the vibration of the air-conditioning duct to improve the power generation efficiency of the power generator. For the reasons stated above, the present invention is industrially applicable.

What is claimed is:

1. A power generator to be used in a state that the power generator is fixedly attached to an air-conditioning duct, the power generator comprising:
   a power generating unit for generating electric power by utilizing vibration of the air-conditioning duct; and
   a supporting member for supporting the power generating unit,
   wherein the power generating unit constitutes a two-degree-freedom vibration system including a first vibration system having a first mass portion and a first spring portion for coupling the first mass portion with the supporting member and a second vibration system having a second mass portion and a second spring portion for coupling the second mass portion with the first mass portion,
   wherein a second mass $m_2$ [kg] of the second mass portion is smaller than a first mass $m_1$ [kg] of the first mass portion, and
   wherein the power generating unit is configured so that each of a first natural frequency $\omega_1$ of the first vibration system and a second natural frequency $\omega_2$ of the second vibration system is in the range of 14 to 42 Hz by adjusting the first mass $m_1$ [kg] of the first mass portion, a first spring constant $k_1$ [N/m] of the first spring portion, the second mass $m_2$ [kg] of the second mass portion and a second spring constant $k_2$ [N/m] of the second spring portion, wherein the second mass portion includes a permanent magnet provided so that the permanent magnet can be displaced along a magnetization direction thereof, wherein the first mass portion includes a coil provided on the outer peripheral side of the permanent magnet so as to surround the permanent magnet, wherein the first mass portion further includes a holding member for holding the coil, and wherein the holding member is formed of a resin material containing non-magnetic metallic particles.

2. The power generator claimed in claim 1, wherein the power generator is configured so that each of the first natural frequency $\omega_1$ of the first vibration system and the second natural frequency $\omega_2$ of the second vibration system is in the range of 14 to 38 Hz.

3. The power generator claimed in claim 1, wherein a first natural angular frequency $\Omega_1=(k_1/m_1)^{1/2}$ of the first vibration system is in the range of 200 to 250 rad/S, a second natural angular frequency $\Omega_2=(k_2/m_2)^{1/2}$ of the second vibration system is in the range of 60 to 120 rad/S and a mass ratio $\mu=m_2/m_1$ of the first mass portion and the second mass portion is in the range of 0.4 to 1.

4. The power generator claimed in claim 1, wherein when a power generation amount of the power generator at a first resonance frequency of the power generator is defined as "$A_1$" [mW/100 mG] and a power generation amount of the power generator at a second resonance frequency of the power generator is defined as "$A_2$" [mW/100 mG], the power generator is configured so that "$A_1$" and "$A_2$" satisfy a relationship of $0.9A_2 \leq A_1 \leq 1.1A_2$.

5. The power generator claimed in claim 4, wherein when a minimum power generation amount of the power generator in a frequency band between the first resonance frequency and the second resonance frequency is defined as "$A_3$" [mW/100 mG], the power generator is configured so that "$A_3$" is equal to or more than $0.25[(A_1+A_2)/2]$ [mW/100 mG] but less than $0.8[(A_1+A_2)/2]$ [mW/100 mG].

6. The power generator claimed in claim 4, wherein when a minimum power generation amount of the power generator in a frequency band between the first resonance frequency and the second resonance frequency is defined as "$A_3$" [mW/100 mG], the power generator is configured so that "$A_3$" is equal to or more than $0.8[(A_1+A_2)/2]$ [mW/100 mG] but equal to or less than $0.9[(A_1+A_2)/2]$ [mW/100 mG].

7. The power generator claimed in claim 4, wherein the power generator is configured to satisfy the relationship of the power generation amounts by setting damping coefficients $C_2$ of the second vibration system respectively corresponding to the first natural frequency and the second natural frequency.

8. The power generator claimed in claim 7, wherein the damping coefficient $C_2$ corresponding to the first natural frequency is in the range of 6 to 10 [N/(m/s)] and the damping coefficient $C_2$ corresponding to the second natural frequency is in the range of 6 to 10 [N/(m/s)].

9. The power generator claimed in claim 1, wherein the second mass portion further includes a magnetic member fixed to the permanent magnet, the magnetic member is formed of a magnetic material having a specific weight equal to or more than 7, and the permanent magnet is coupled with the second spring portion through the magnetic member.

10. A power generator set comprising:
the power generator defined in claim 1; and
a weight for adjusting a power generation amount of the power generator.

11. A power generation system comprising:
the power generator defined in claim 1; and
an air-conditioning duct to which the power generator is fixedly attached through the supporting member.

12. A power generator to used in a state that the power generator is fixedly attached to an air-conditioning duct, the power generator comprising:

a power generating unit for generating electric power by utilizing vibration of the air-conditioning duct; and a supporting member for supporting the power generating unit, wherein the power generating unit constitutes a two-degree-freedom vibration system including a first vibration system having a first mass portion and a first spring portion for coupling the first mass portion with the supporting member and a second vibration system having a second mass portion and a second spring portion for coupling the second mass portion with the first mass portion, wherein a second mass m2 [kg] of the second mass portion is smaller than a first mass m1 [kg] of the first mass portion, and wherein the power generating unit is configured so that each of a first natural frequency $\omega_1$ of the first vibration system and a second natural frequency $\omega_2$ of the second vibration system is in the range of 14 to 42 Hz by adjusting the first mass m1 [kg] of the first mass portion, a first spring constant k1 [N/m] of the first spring portion, the second mass m2 [kg] of the second mass portion and a second spring constant k2 [N/m] of the second spring portion, wherein the second mass portion includes a permanent magnet provided so that the permanent magnet can be displaced along a magnetization direction thereof, wherein the first mass portion includes a coil provided on the outer peripheral side of the permanent magnet so as to surround the permanent magnet, wherein the second mass portion further includes a magnetic member fixed to the permanent magnet, and wherein the permanent magnet is coupled with the second spring portion through the magnetic member.

* * * * *